(12) United States Patent
Schiarizzi

(10) Patent No.: US 10,397,555 B2
(45) Date of Patent: Aug. 27, 2019

(54) DYNAMIC IMAGE GENERATION SYSTEM

(71) Applicant: FOURTH WAVE LLC, Washington, DC (US)

(72) Inventor: Joseph Domenic Schiarizzi, Washington, DC (US)

(73) Assignee: Fourth Wave LLC, Washington, DC (US)

(*) Notice: Subject to any disclaimer, the term of this patent is extended or adjusted under 35 U.S.C. 154(b) by 0 days.

(21) Appl. No.: 15/687,417

(22) Filed: Aug. 25, 2017

(65) Prior Publication Data
US 2019/0068942 A1    Feb. 28, 2019

(51) Int. Cl.
| | |
|---|---|
| *G06T 7/40* | (2017.01) |
| *G06T 7/50* | (2017.01) |
| *G06T 7/90* | (2017.01) |
| *H04N 13/261* | (2018.01) |
| *G06T 7/543* | (2017.01) |
| *G06F 16/00* | (2019.01) |

(52) U.S. Cl.
CPC ........... *H04N 13/261* (2018.05); *G06F 16/00* (2019.01); *G06T 7/40* (2013.01); *G06T 7/50* (2017.01); *G06T 7/543* (2017.01); *G06T 7/90* (2017.01); *G06T 2207/10024* (2013.01); *G06T 2207/30176* (2013.01)

(58) Field of Classification Search
CPC ...... H04N 13/261; H04N 13/026; G06T 7/50; G06T 7/90; G06T 7/40
See application file for complete search history.

(56) References Cited

U.S. PATENT DOCUMENTS

| | | | |
|---|---|---|---|
| 6,742,161 B1* | 5/2004 | James | G06K 9/00 715/205 |
| 2006/0082571 A1* | 4/2006 | McDaniel | G06T 11/203 345/419 |
| 2012/0287121 A1* | 11/2012 | Hong | G06F 17/50 345/419 |
| 2015/0178933 A1* | 6/2015 | Han | G06T 7/579 382/154 |
| 2018/0012394 A1* | 1/2018 | Averianov | G06T 15/04 |

FOREIGN PATENT DOCUMENTS

JP           11066130 A  *  3/1999

* cited by examiner

*Primary Examiner* — Todd Buttram
(74) *Attorney, Agent, or Firm* — The Law Firm of A Q Basit

(57) ABSTRACT

An electronic communications method includes receiving, by a device, electronic information associated with a two-dimensional image. The electronic communications method also includes analyzing, by the device, the electronic information. The electronic communications method includes generating, by the device, a three-dimensional electronic image based on the electronic information.

18 Claims, 23 Drawing Sheets

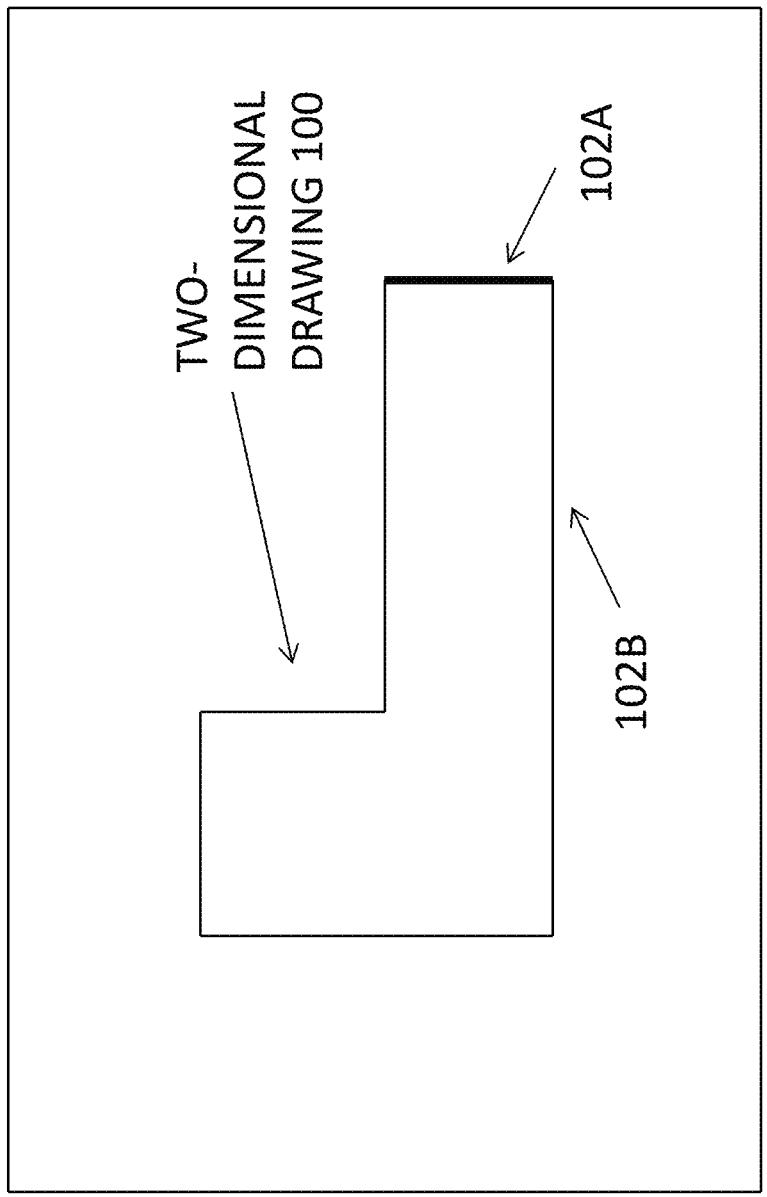

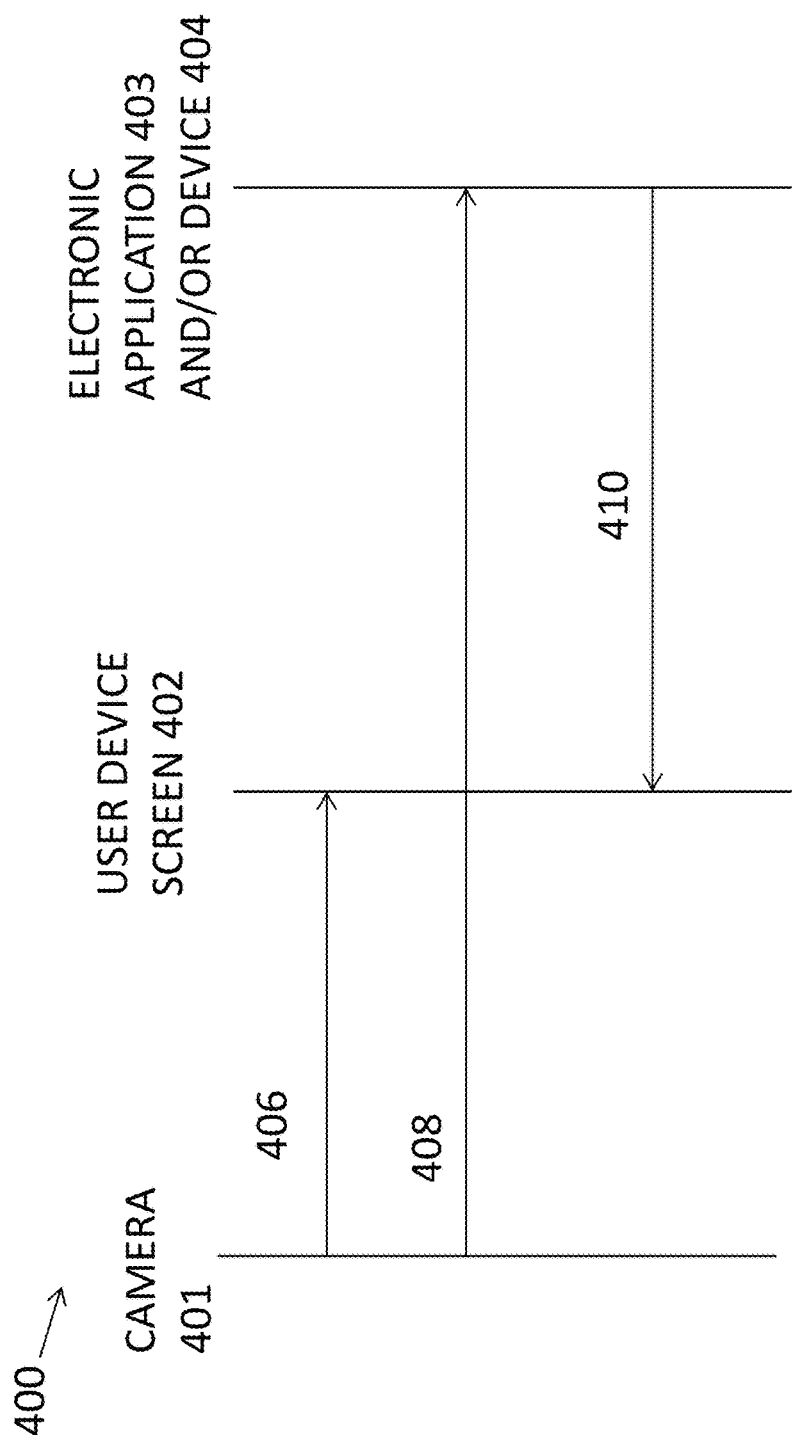

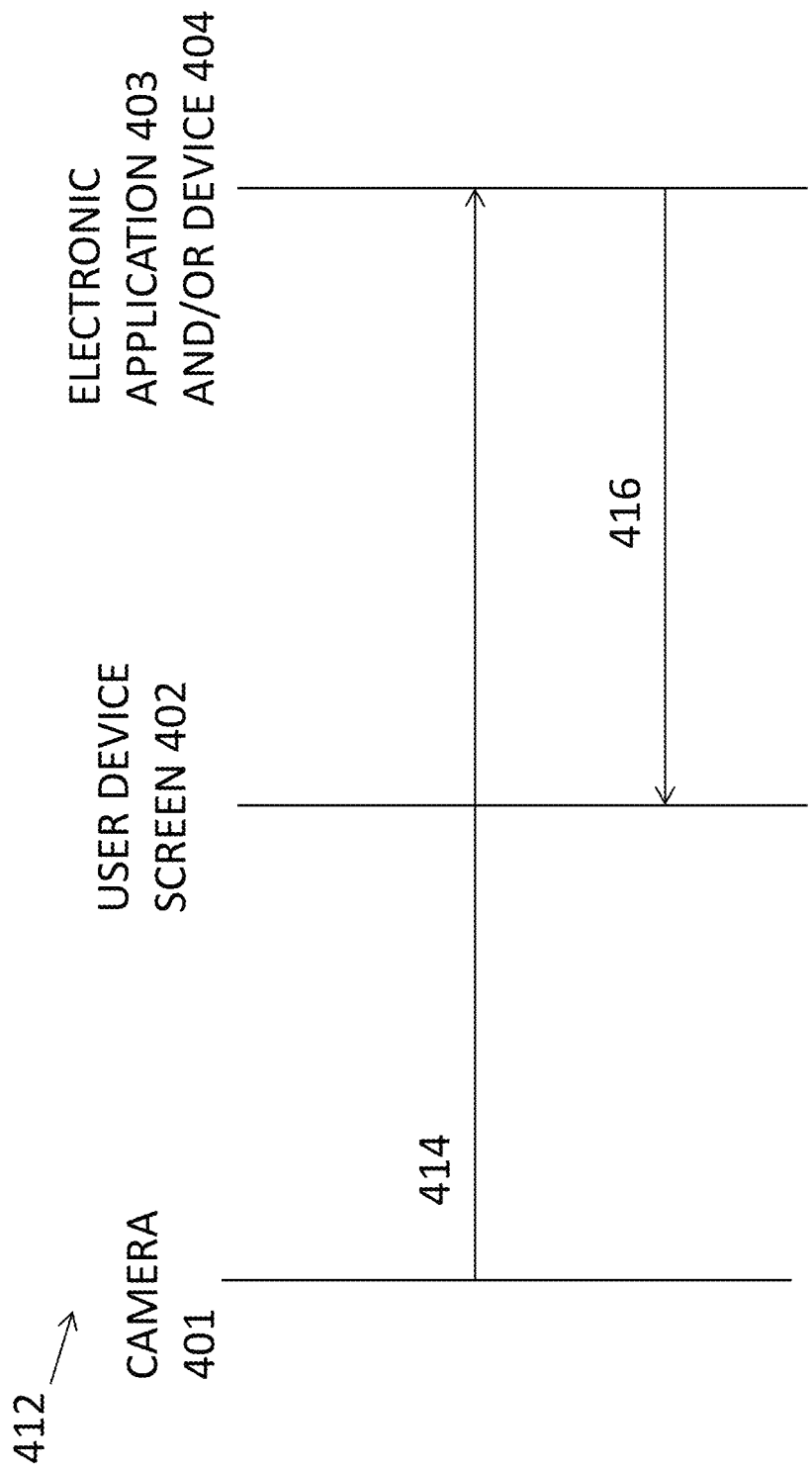

| ORIENTATION LOCATION-DISTANCE (814) | NUMERICAL VALUE (816) | WORDING (818) |
|---|---|---|
| ORIENTATION 1 | 15 | TOP ELEVATION |
| ORIENTATION 3 | NULL | SIDE ELEVATION |
| ORIENTATION 13 | NULL | FRONT ELEVATION |
| ● | ● | ● |
| ● | ● | ● |

| COLOR (822) | NUMERICAL VALUE (824) | WORDING (826) |
|---|---|---|
| COLOR 1 | NULL | BLUE |
| COLOR 2 | NULL | NO COLOR |
| COLOR 3 | 16 | NULL |
| ● | ● | ● |
| ● | ● | ● |

| TEXTURE (830) | NUMERICAL VALUE (832) | WORDING (834) |
|---|---|---|
| TEXTURE 1 | NULL | BLUE |
| TEXTURE 2 | 12 | ROUGH |
| TEXTURE 3 | NULL | SMOOTH |
| ● | ● | ● |
| ● | ● | ● |

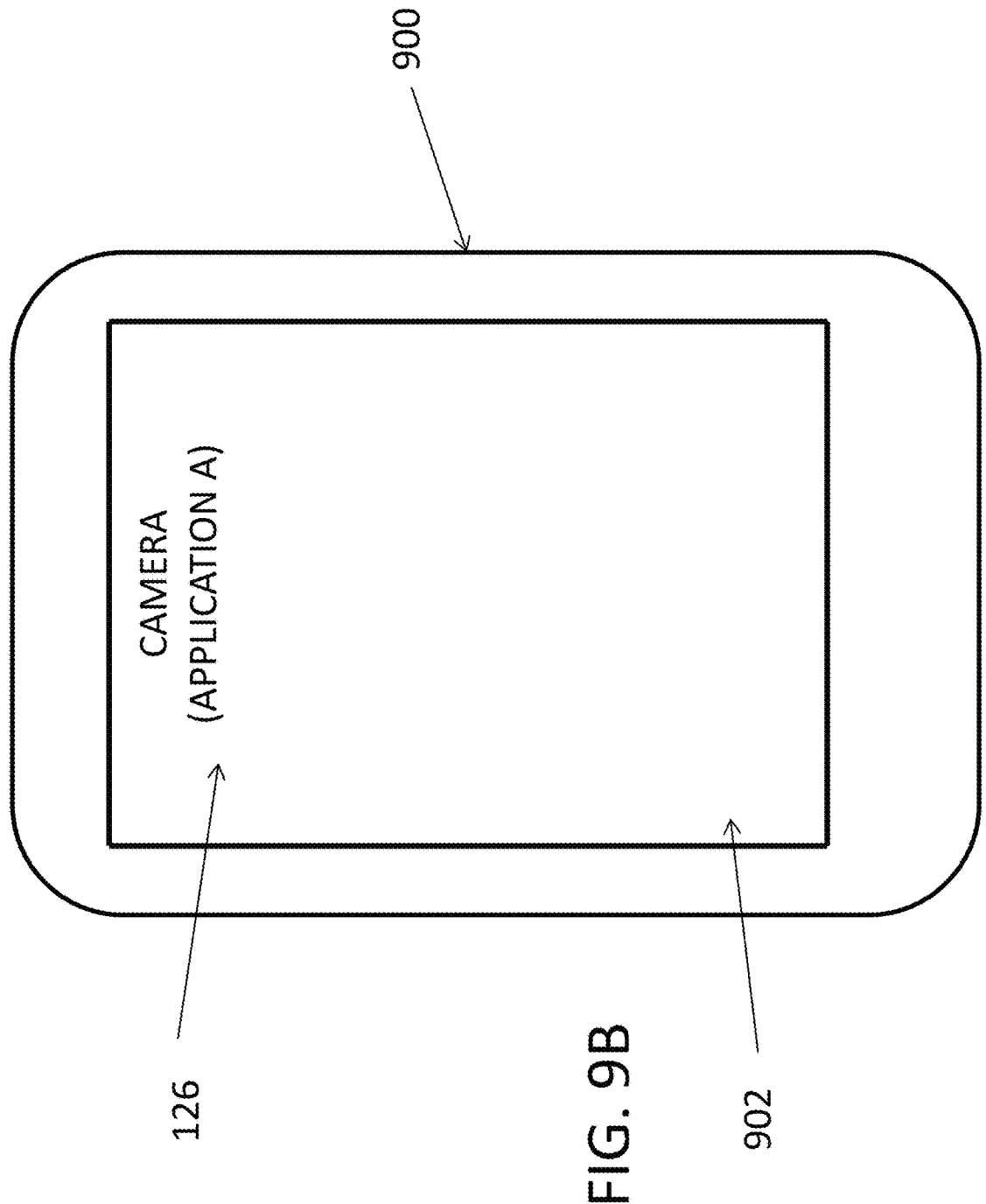

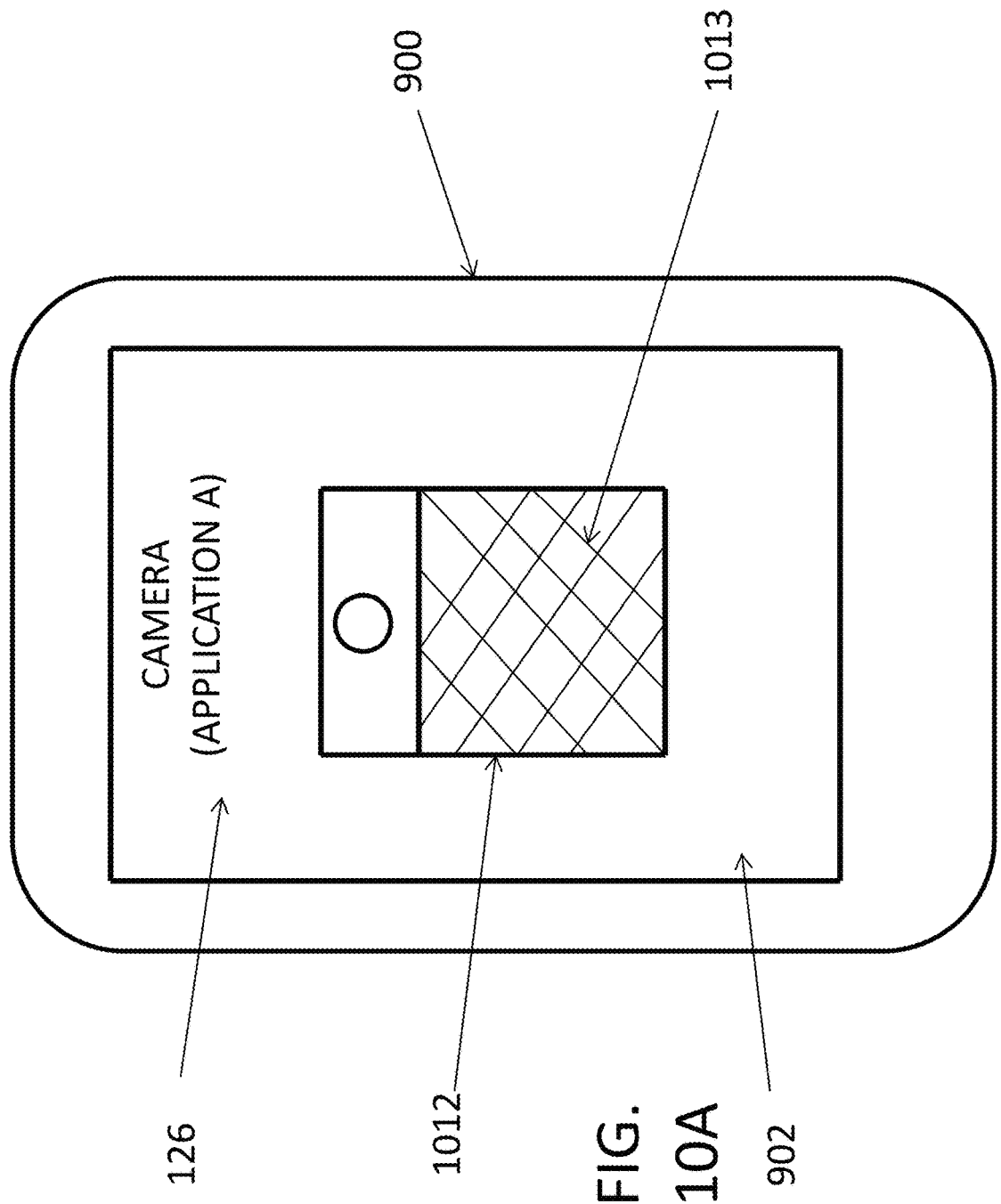

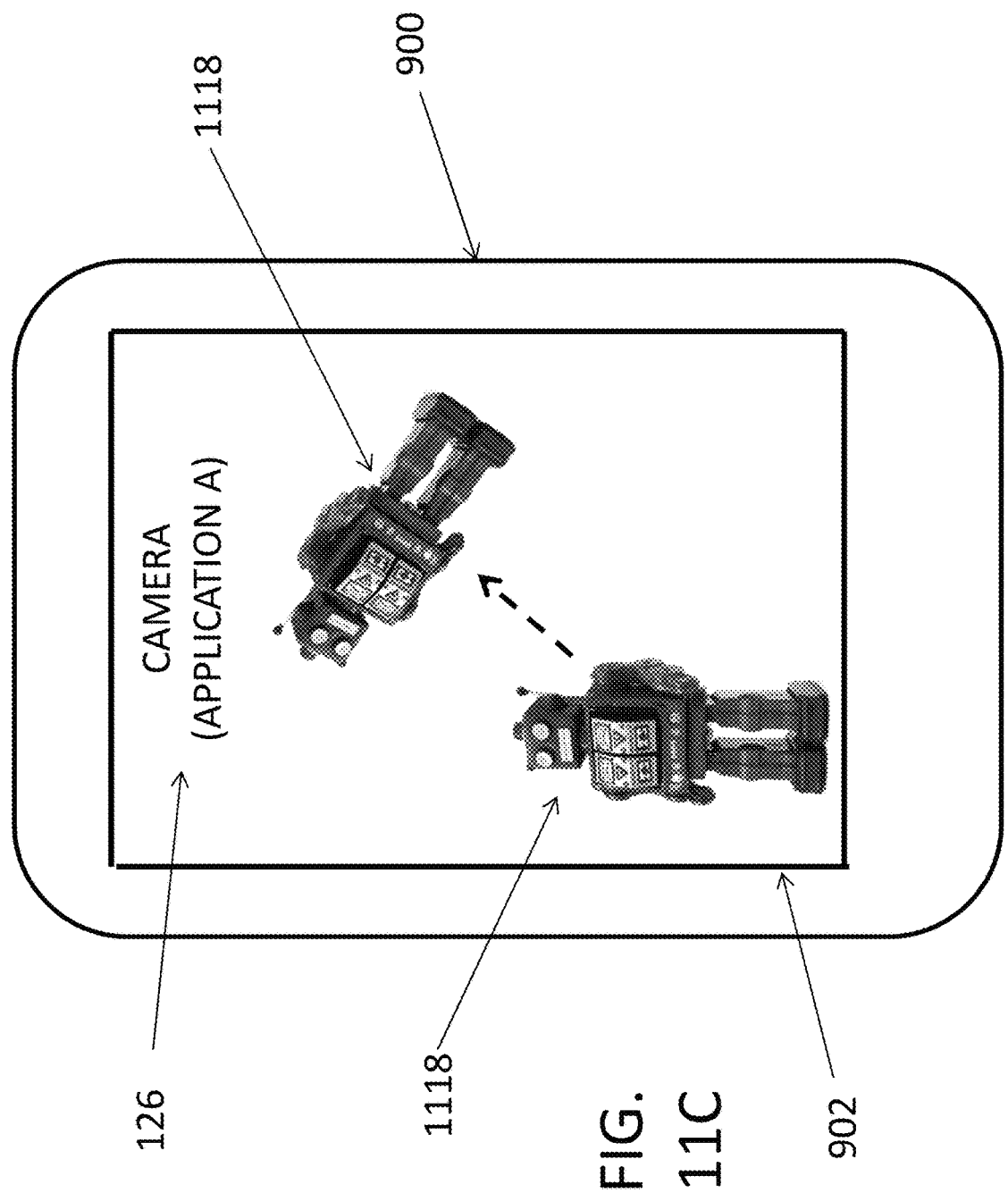

DYNAMIC IMAGE GENERATION SYSTEM

BACKGROUND

Paper, electronic equivalents to paper, blackboards, whiteboards, or any other surface, are used as a background surface to write words, numbers, and/or create drawings. While these types of backgrounds may be used to draw a two-dimensional image or even a three-dimensional image, there are no known processes to automatically and/or dynamically change a two-dimensional image created on paper, blackboards, whiteboard, etc., into a three-dimensional image created on another type of background surface.

BRIEF DESCRIPTION OF DRAWINGS

FIGS. 1A-1C is a diagram of an example environment in which systems and/or methods described herein may be implemented;

FIGS. 4A and 4B are example communications flow diagrams;

FIGS. 8A-8D are example database structures that store electronic information about different types of generated images;

FIGS. 9A-9B are example diagrams for selecting an electronic application that dynamically generates image;

FIGS. 10A-10B and 11A-11C are example diagrams for using an electronic application to dynamically generate images.

DETAILED DESCRIPTION OF PREFERRED EMBODIMENTS

Figure 1B:
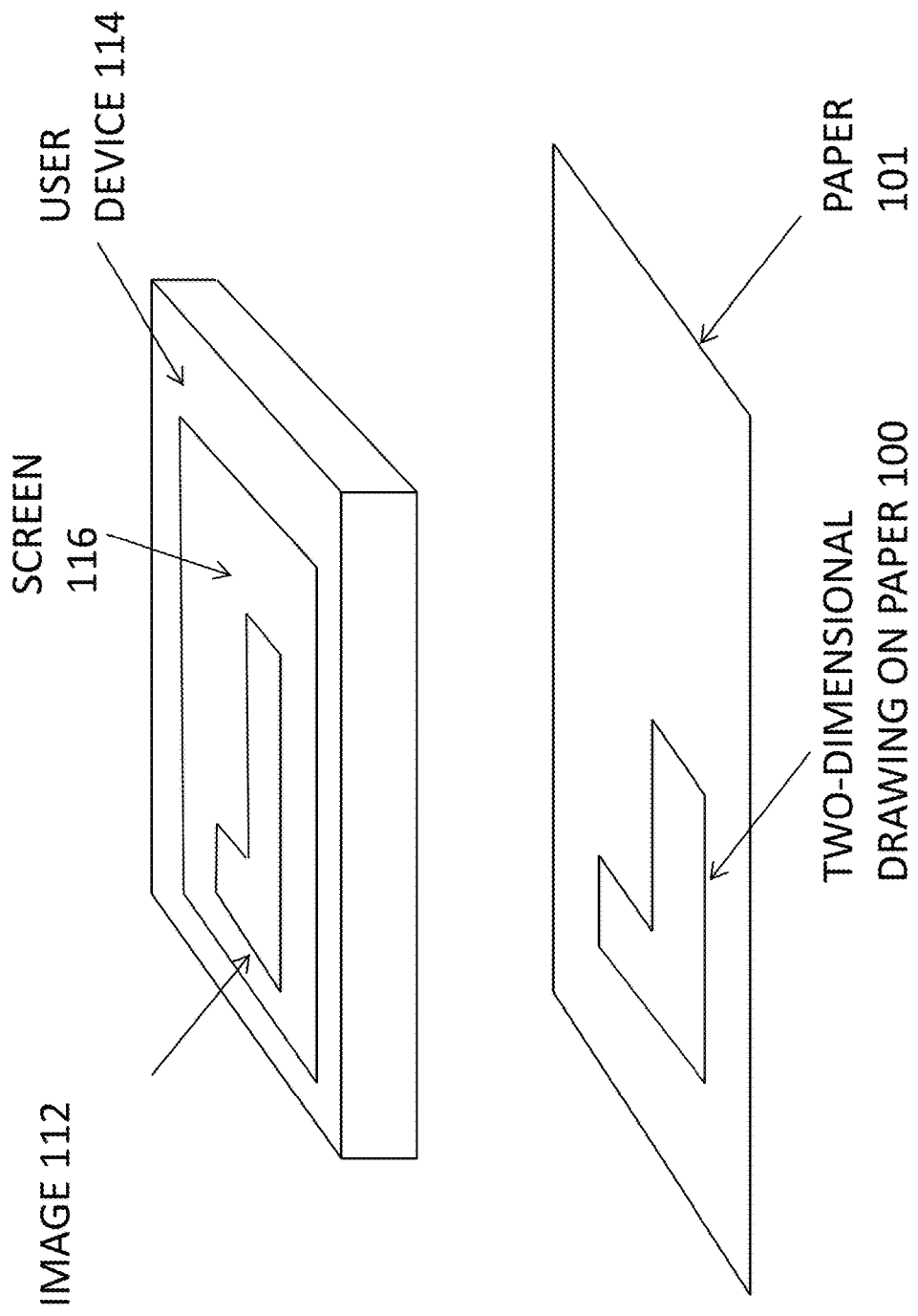

The following detailed description refers to the accompanying drawings. The same reference numbers in different drawings may identify the same or similar elements.

Systems, devices, and/or methods described herein may allow for a user, using an electronic application implemented on a user device (e.g., smartphone, laptop, etc.) to take an image (e.g., an electronic image with a camera) of a two-dimensional image, or obtain electronic information about a two-dimensional image, generated on one surface, and dynamically generate a three-dimensional electronic image on a screen of the user device (e.g., a smartphone, tablet, etc.) based on one or more features of the two-dimensional image. For example, there may be a two-dimensional image of a chemical formula (e.g., $H_2O$) drawn within a particular paper-based textbook. In embodiments, the user may select an electronic application on a user device which may then control a camera device associated with the user device. In embodiments, the camera device may then be used by the electronic application to take an electronic image of the chemical formula. Upon taking the electronic image (which may or may not be displayed on the user device screen), the electronic application may use electronic information associated with the electronic image to dynamically generate a three-dimensional electronic image of the chemical formula. Accordingly, the user device screen will display a three-dimensional electronic image of the chemical formula based on the two-dimensional image that exists in the textbook. In this non-limiting example, the three-dimensional electronic image may include particular features that accurately show relationships between different atoms, valence values, different bond thicknesses and lengths, etc. In further embodiments, the electronic application may then be used by the user to see different orientations of the chemical formula, colors, textures, and other features that were not described in the textbook. In embodiments, the user may also use the user device, in conjunction with the electronic application, to perform tracking of the three-dimensional electronic image as it is mapped to the two-dimensional image.

In embodiments, the electronic application may be used to generate other types of three-dimensional drawings associated with two-dimensional architectural drawings, two-dimensional electronic circuit figures, two-dimensional cartoon images, two-dimensional mechanical systems, and other types of drawings that can be dynamically converted into a three-dimensional electronic image. In embodiments, the electronic application may analyze different features of a drawing (e.g., line thickness, location, number of shapes, text, numbers, etc.) to determine how a particular dynamically generated three-dimensional electronic image should be displayed via the user device. For example, the electronic application may generate texture imagery and information in a three-dimensional electronic image that is not observable on a related two-dimensional mechanical design figure.

Accordingly, the electronic application may provide one or more electronic processes that (1) interact with a type of camera device that is associated with a user device (2) use the camera device to takes an image of a two-dimensional image, (3) dynamically generate a three-dimensional electronic image based on electronic information of the two-dimensional image without additional user input or effort, (4) display the three-dimensional electronic image and other information on the user device, and (5) allow a user, via the electronic application, to manipulate the three-dimensional electronic image by rotating, animating, and/or zooming in/out via tracking (e.g., spatially mapping the three-dimensional electronic image with the two-dimensional image) and/or animation features.

FIG. 1A shows an example two-dimensional drawing 100 that has been transcribed on paper 101. In embodiments, two-dimensional drawing 100 may be transcribed by pen, pencil, or another process that allows for transcribing, or printing, images on paper. While two-dimensional drawing 100 is shown on paper, two-dimensional drawing 100 may be on another type of background, electronic and/or non-electronic. As shown in FIG. 1A, two-dimensional drawing 100 is made up of multiple lines including line 102A and 102B. As shown in FIG. 1A, line 102A has a different thickness level than line 102B.

FIG. 1B shows an example process of using a user device 114 to take an image of two-dimensional drawing 100, as described in FIG. 1A. In embodiments, user device 114 may be user device 124 as described in FIG. 2. As shown in FIG. 1B, user device 114 may be placed over paper 101 so that an image (image 112) of two-dimensional drawing 100 may appears on the user device screen (screen 116). While not shown in FIG. 1B, user device 114 may be held over paper 101 by the user or by a mechanical, or electromechanical, holding device. In embodiments, the user may select an electronic application on user device 114 which then takes control of the camera device associated with user device 114. Thus, selecting the electronic application results in user device 114's camera mode (and camera device) to be activated. Accordingly, user device 114 may be in a camera mode that now interacts with an electronic application which can dynamically generate three-dimensional electronic images. In embodiments, the user decides to take an electronic image of two-dimensional drawing 100. In embodiments, the electronic image may be taken by touching screen 116 (e.g., a single push, swipe, touch of screen 116, actuating a button on user device 114, using voice commands, etc.).

Figure 1C:
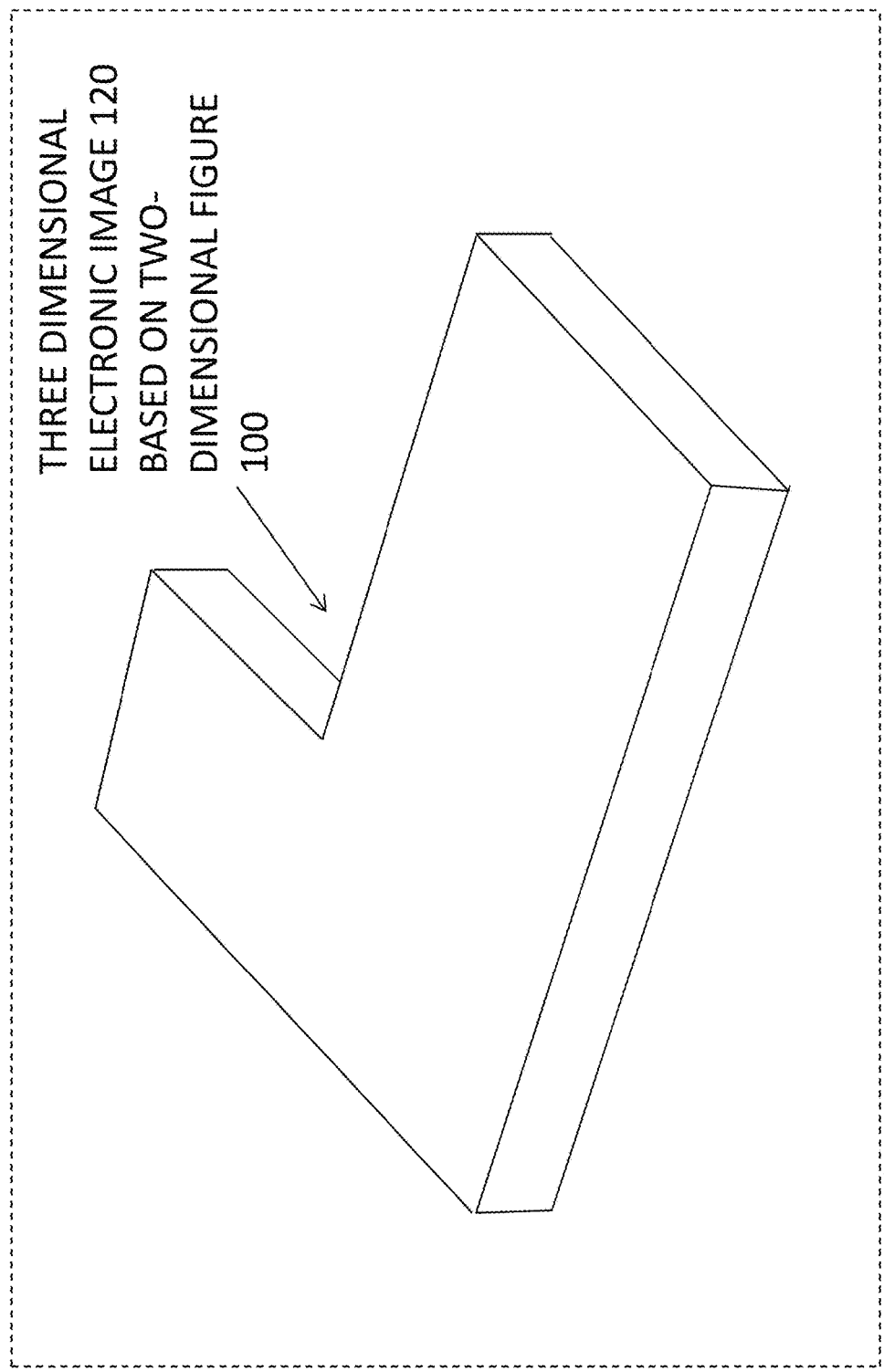

FIG. 1C shows an example three-dimensional electronic image 120 displayed on screen 116. In embodiments, three-dimensional electronic image 120 is generated by the electronic application, stored by user device 114, by using electronic information taken from the electronic image taken by the camera within user device 114. In particular, for this example, the electronic application analyzes the lines, the position of the endpoints of the lines, and line thickness. As shown in FIG. 1A, two-dimensional drawing 100 has lines 102A and 102B with different line thicknesses which allow the electronic application to determine features that will be shown in the three-dimensional electronic image. In this non-limiting example, the line thickness of 102A may determine the height of the three-dimensional electronic image. Once the three-dimensional electronic image is generated, in embodiments, three-dimensional image 120 may then be animated and rotated in a particular direction (e.g., 90 degrees, 180 degrees, up and down, etc.). In further embodiments, three-dimensional image 120 may be stored by user device 114 for later electronic manipulation.

As such, a user may use an electronic application in conjunction with a user device and an associated camera device to generate a three-dimensional electronic image from a two-dimensional image and display the three-dimensional electronic image on the user device screen. Thus, the user, and others, may view an electronically generated image as it would most likely exist in the non-electronic world without having to spend additional time and cost to generate a non-electronic three-dimensional model of a particular two-dimensional image. Furthermore, in embodiments, the electronically generated three-dimensional image may then be further manipulated and may have additional information about the electronically generated three-dimensional image that is electronically displayed on the user device screen. In embodiments, the electronic application may also include alphanumeric information about electronically generated three-dimensional image that provides additional information about the electronically generated three-dimensional image.

Figure 2:
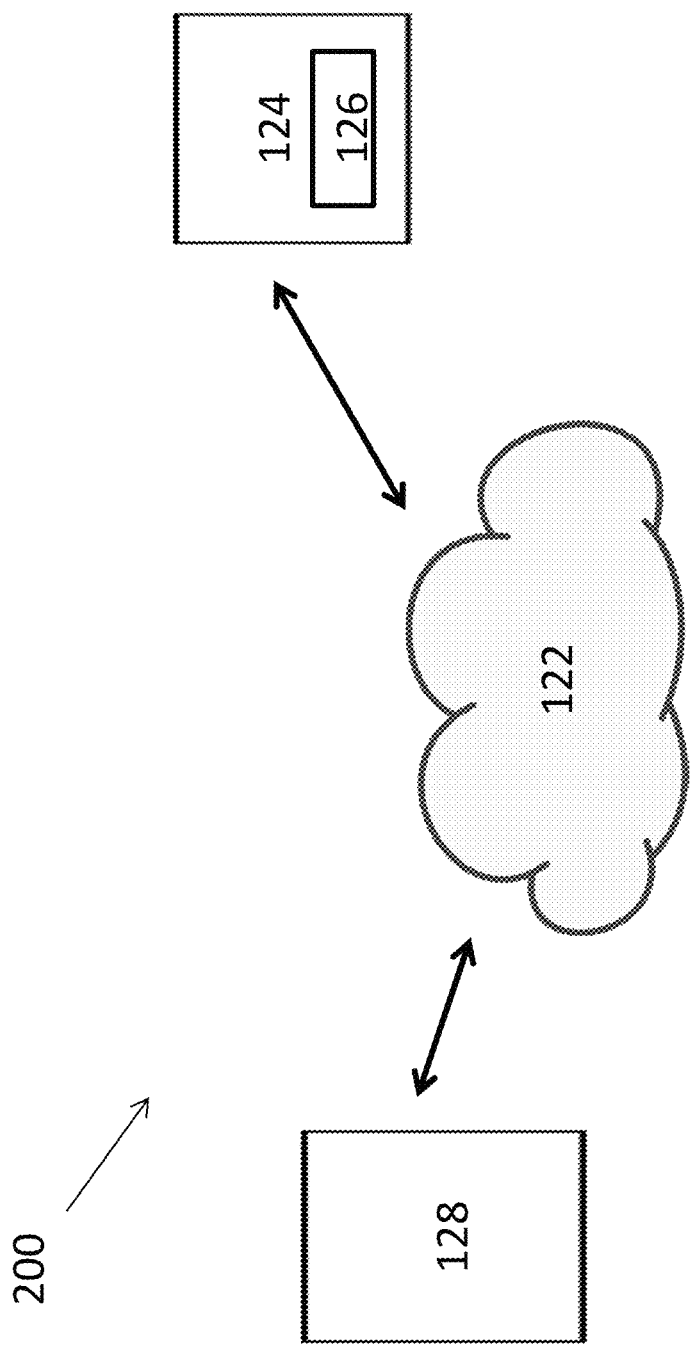
FIG. 2 is a diagram of a network environment.

FIG. 2 is a diagram of example environment 200 in which systems, devices, and/or methods described herein may be implemented. FIG. 2 shows network 122, user device 124, electronic application 126, and image generation server 128.

Network 122 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 122 may include a cellular network, a public land mobile network (PLMN), a second generation (2G) network, a third generation (3G) network, a fourth generation (4G) network, a fifth generation (5G) network, and/or another network. In embodiments, network 122 may allow for devices describe in any of the figures to electronically communicate (e.g., using emails, electronic signals, URL links, web links, electronic bits, fiber optic signals, wireless signals, wired signals, etc.) with each other so as to send and receive various types of electronic communications.

User device 124 may include any computation or communications device that is capable of communicating with a network (e.g., network 122). For example, user device 124 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, a virtual reality (VR) headset or device, a augmented reality (AR) headset or device, or another type of computation or communications device.

User device 124 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 124. User device 124 may have a touch screen and/or a keyboard that allows a user to electronically interact with an electronic application. In embodiments, a user may swipe, press, or touch user device 124 in such a manner that one or more electronic actions will be initiated by user device 124 via an electronic application.

User device 124 may include a variety of applications, such as, for example, an image generation application, an e-mail application, a telephone application, a camera application, a video application, a multi-media application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Electronic application 126 may interact with image generation server 128 and/or user device 124 to electronically analyze electronic information (associated with a two-dimensional image) and dynamically generate a three-dimensional electronic image based on the electronic information. In embodiments, electronic application 126 may be analyze electronic information associated with the shape, orientation, distance, location, color, and texture associated with the two-dimensional image. In embodiments, electronic application 126 may determine, based on the electronic information, the three-dimensional electronic image to be generated and displayed on user device 124 or any other user device. In embodiments, electronic application 126 may generate animation and/or tracking features associated with a generated three-dimensional electronic image. In further embodiments, electronic application 126 may generate alphanumeric information about a generated three-dimensional electronic image and display the alphanumeric information along with the generated three-dimensional electronic image or display the alphanumeric information on another electronic page on user device 124.

Image generation server 128 may include one or more computational or communication devices that gather, process, store, and/or provide information relating to one or more web pages, electronic pages, and/or images associated with electronic application 126 that is searchable and viewable over network 122. While FIG. 2 shows an image generation server 128 there may be additional image generation 128 associated with electronic application 126. While FIG. 2 shows electronic application 126, there may be multiple different types of electronic applications 126 that each has their own server(s) that are similar to image generation server 128. In embodiments, image generation server 128 may store one or more electronic resources and/or libraries that allow electronic application 126 to generate three-dimensional images for different types of two-dimensional images.

Figure 3:
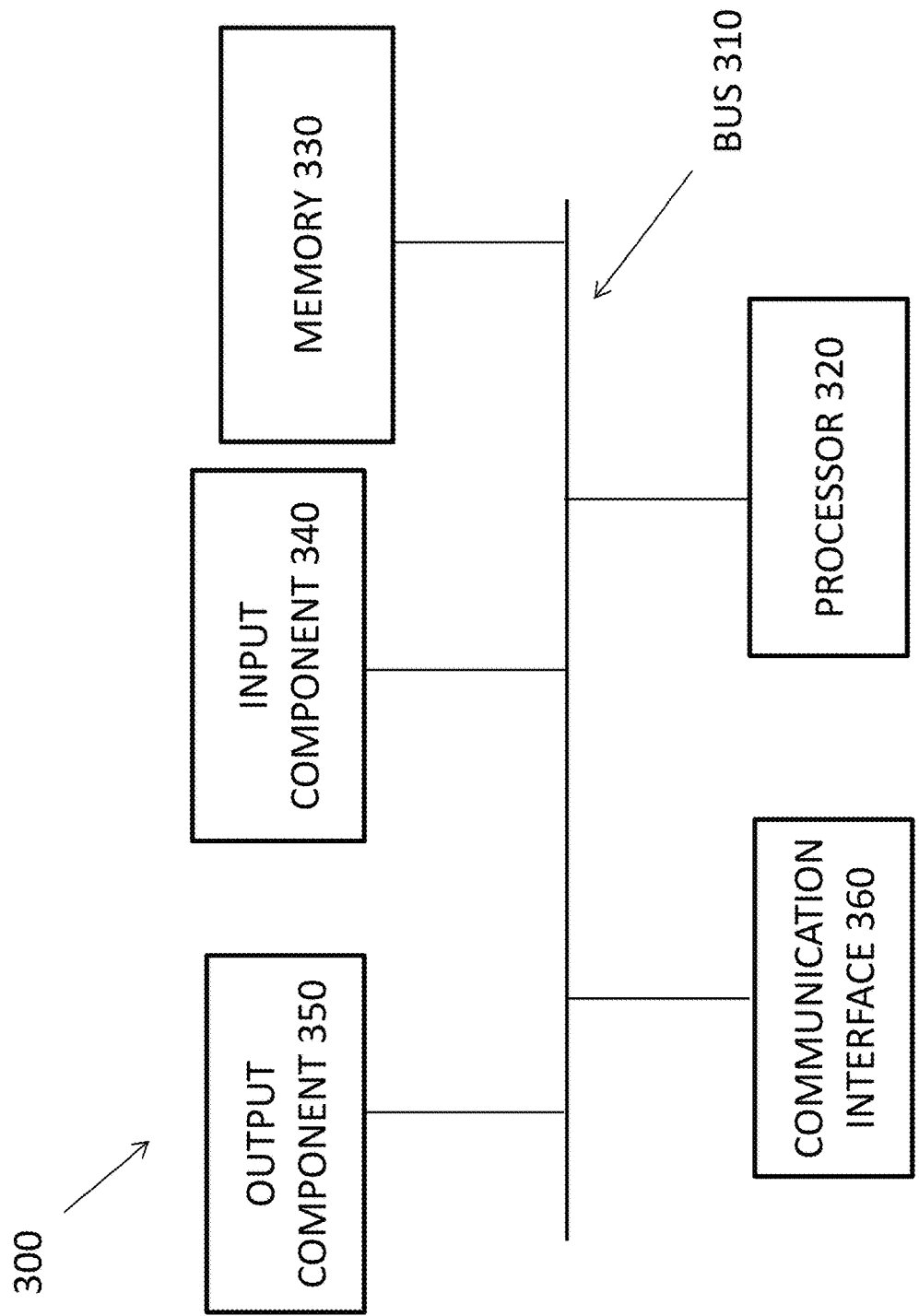
FIG. 3 is a diagram of an example computing device.

FIG. 3 is a diagram of example components of a device 300. Device 300 may correspond to user device 124 and image generation server 128. Alternatively, or additionally, user device 124 and image generation server 128 may include one or more devices 300 and/or one or more components of device 300. In embodiments, device 300 may correspond to one or more modules described in FIG. 5.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like.

In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 122.

As will be described in detail below, device 300 may perform certain operations. Device 300 may perform these operations in response to processor 320 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4A describes an example communication flow process 400 for generating a three-dimensional electronic image. As shown in FIG. 4A, communication flow process 400 includes camera 401, user device screen 402 (which is a part of a user device such as user device 124), electronic application 403 (e.g., electronic application 126), and device 404 (e.g., image generation server 128). In embodiments, camera 401 is used to take an image of a two-dimensional image (e.g., image, drawing, figure, etc.). In embodiments, camera 401 may generate an electronic two-dimensional image which is sent via electronic communication 406 for display on user device screen 402. In embodiments, camera 401 may also generate electronic communication 408, which includes electronic information about the two-dimensional image, to electronic application 402 and/or device 404. In embodiments, electronic communication 408 may occur at the same time as electronic communication 406, before the occurrence of electronic communication 406, or after the occurrence of electronic communication 406. In embodiments, electronic application 403 and/or device 404 may generate a three-dimensional electronic image which is sent via electronic communication 410 for display on user device screen 402.

FIG. 4B describes an example communication flow process 412 for generating a three-dimensional electronic image. As shown in FIG. 4B, communication flow process 400 includes camera 401, user device screen 402 (which is a part of user device 404), electronic application 403 (e.g., electronic application 126), and device 404 (e.g., image generation server 128). In embodiments, camera 401 is used to take an image of a two-dimensional image (e.g., image, drawing, figure, etc.). In embodiments, camera 401 may also generate electronic communication 414, which includes electronic information about the two-dimensional image, to electronic application 402 and/or device 404. In embodiments, no electronic image is generated for display on user device screen 402. In embodiments, electronic application 403 and/or device 404 may generate a three-dimensional electronic image which is sent via electronic communication 416 for display on user device screen 402. In embodiments, electronic communication 416 may occur automatically and may occur within a particular period of time upon receipt of electronic communication 414.

Figure 5:
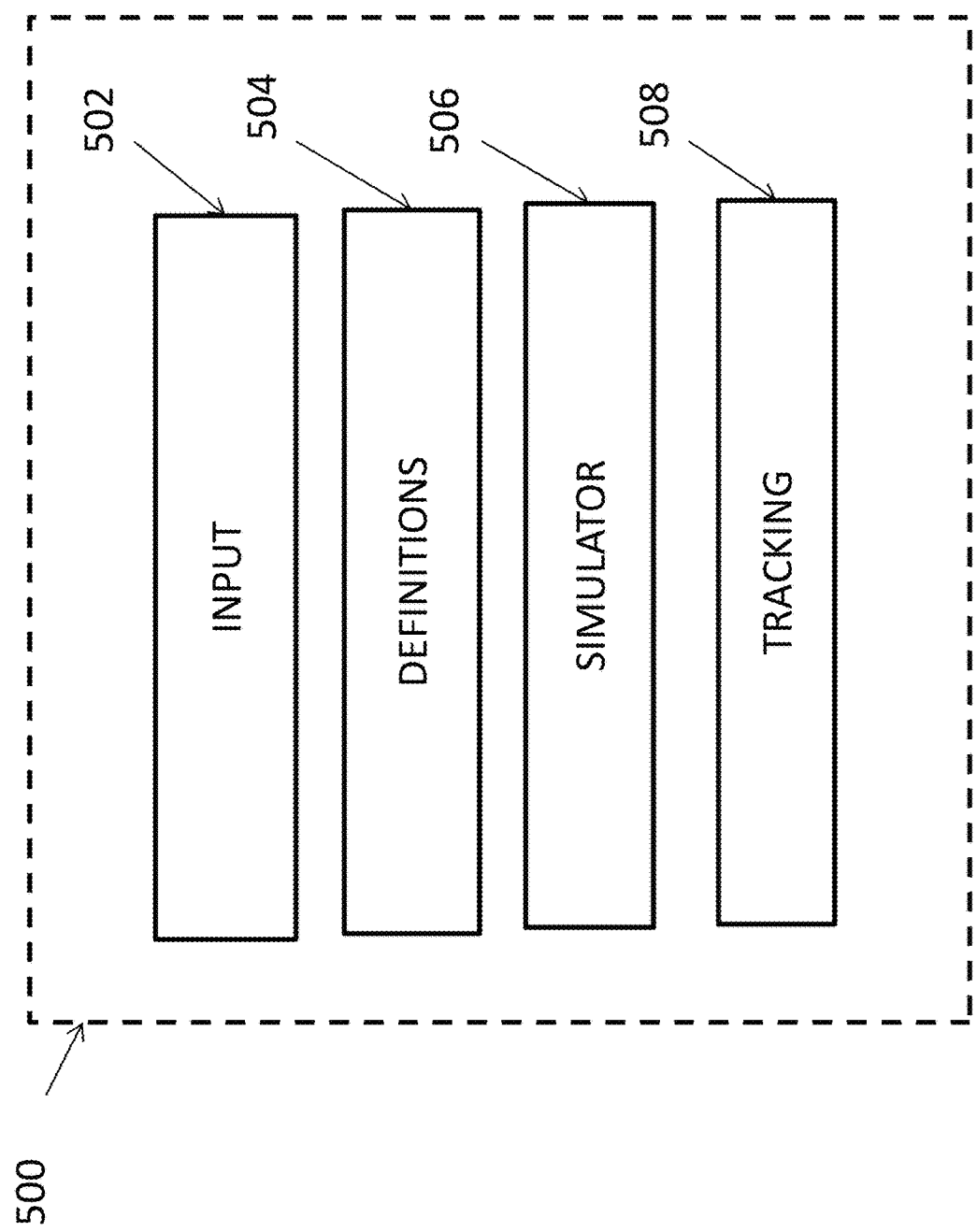
FIG. 5 is a diagram of an example system for dynamically generating an image.

FIG. 5 is an example system diagram of electronic computer-based modules for dynamically generating a three-dimensional electronic image. In embodiments, system 500 includes input 502, definitions 504, simulator 506, and tracking 508. In embodiments, system 500 may be entirely stored by electronic application 126 on user device 124, entirely stored by image generation server 128, or partially stored by electronic application 126 on user device 124 and partially stored by image generation server 128.

In embodiments, input 502 may receive one or more electronic processes that receive electronic information associated with an electronic image of a two-dimensional image. In embodiments, definition 504 may include one or more databases, electronic libraries, and/other electronic processes that are used to analyze received electronic information, associated with a two-dimensional image, and determine which electronic information is associated with a particular feature that will be a part of a three-dimensional electronic image. In embodiments, simulator 506 may include one or more electronic processes that generate an electronic three-dimensional image based on comparing and/or analyzing electronic information received in input 502 with the stored information in electronic libraries, databases, and other electronic processes in definition 504.

In embodiments, tracking 508 may include one or more electronic processes that can be used to track movement of a user device (e.g. user device 124) and the change in the orientation of a two-dimensional image in comparison to the three-dimensional image. Thus, the tracking allows for the three-dimensional image shown on the user device screen to be spatially mapped to the two-dimensional image. In embodiments, the two-dimensional image may not change in its orientation, but the user device's angle is changed (e.g., a different angle, such as the user device is turned 90 degrees) without any change (or minimal change—e.g., within one inch, six inches, one foot, etc.) to the user device's longitudinal and latitudinal position. Accordingly, the three-dimensional image will not rotate on the user device screen with the rotation of the user device based on the spatial mapping. Also, in embodiments, the two-dimensional image may not change in its orientation, but the user device (e.g., via a person or another device) may be moved from a first position, in comparison to the two-dimensional image, to a second position. For example, at the first position, the user may be viewing a three-dimensional image of a teddy bear's front (e.g., face, belly, etc.), generated by one or more processes described in other figures and based on a two-dimensional image of the teddy bear. In this non-limiting example, at the second position, the user may have walked (or a device may perform the same action) 180 degrees around the two-dimensional image and now the user device displays the teddy bear's rear (e.g., buttocks, back, etc.) while information about the two-dimensional image of the teddy bear is being spatially tracked (e.g., mapped) via the user device's camera (and electronic application 126 and/or image generation server 128). Accordingly, by moving the user device's longitudinal and latitudinal position, and not just its angle, a different perspective (or elevation) of the three-dimensional image may be displayed (e.g., viewing the front instead of the back, the sides, etc.) on the user device. Thus, the tracking feature may allow a user to use information about one image in electronic application 126 (and/or image generation server 128) and create multiple perspectives and views of the three-dimensional image without requiring the user to take additional images, via the user device, at different positions and/or angles of the same two-dimensional image. Additionally, or alternatively, the three-dimensional image may or may not rotate on the user device screen if the two-dimensional image's angle is changed in comparison to the user device without changing the angle and/or position of the user device.

Figure 6:
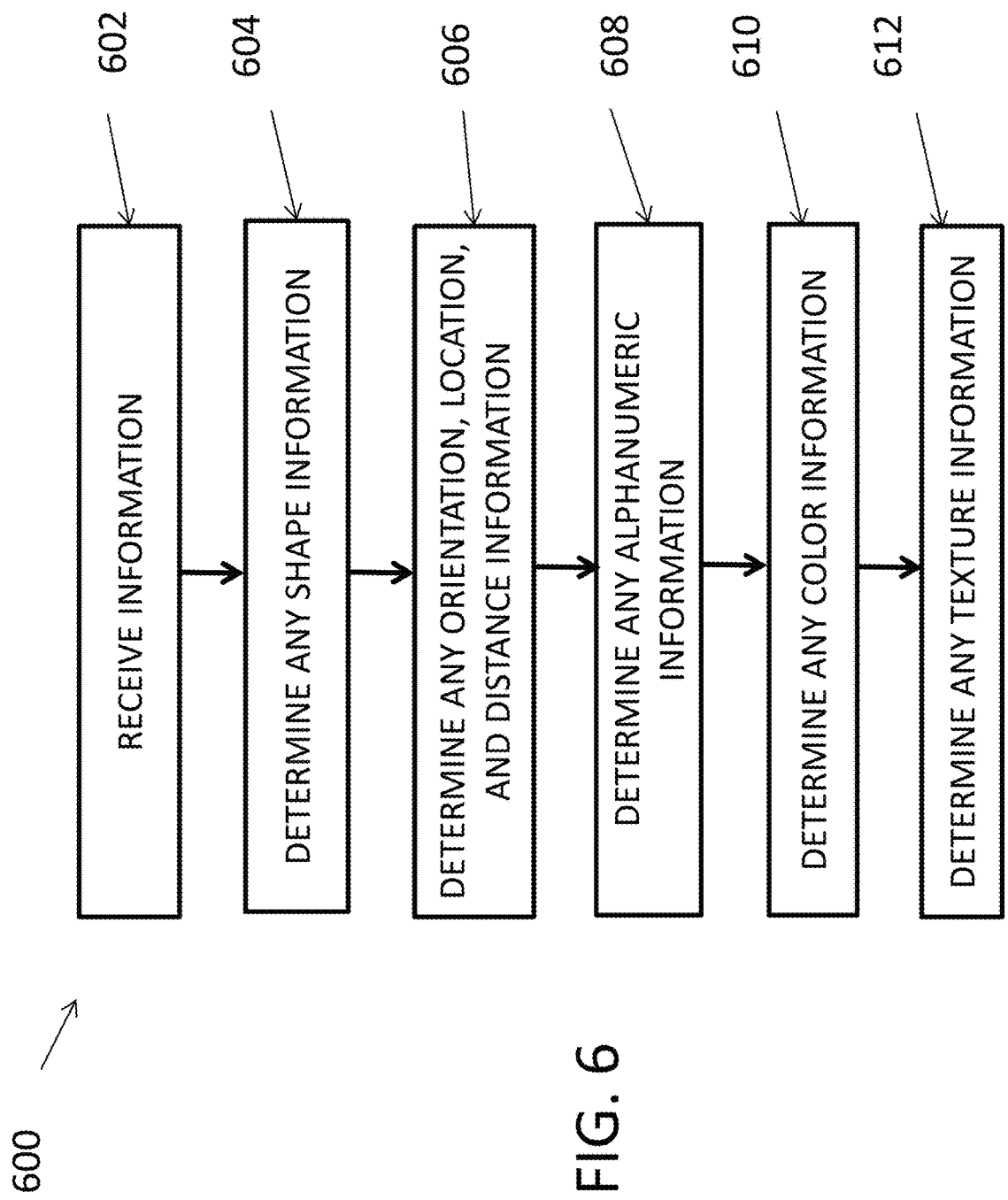
FIG. 6 is a flow chart of an example process for receiving information and determining parameters for generating an image.

FIG. 6 is a flow chart of an example process 600 for determining one or more features for generating a three-dimensional electronic image on a user device screen based on electronic information for a two-dimensional image. In embodiments, example process 600 may be performed by electronic application 126 or image generation server 128 receiving electronic information from user device 124, via electronic application 126, as described in FIG. 2. In embodiments, the two-dimensional image may exist in a non-electronic format or in an electronic format.

At step 602, electronic application 126 and/or image generation server 128 may receive electronic information about a two-dimensional image. In embodiments, the electronic information may be generated by selecting electronic application 126 that then controls a camera device (e.g., a part of user device 124 or separate from user device 124 but in electronic communication with user device 124). In embodiments, the camera device lens, associated with user device 124, is directed to the two-dimensional image. In embodiments, user selection (e.g., via touchscreen, button, keyboard, etc.) or an automatic electronic process (e.g., via pings, signals, and/or other communications) results in the camera device becoming actuated and causing the camera device (also a camera application on user device 124) to take an electronic image of the two-dimensional image. In embodiments, the electronic image may or may not be displayed on the screen of user device 124. In embodiments, electronic information associated with the electronic image is received by electronic application 126 and/or image generation server 128. In embodiments, the two-dimensional electronic image may be displayed on user device 124's screen until a three-dimensional electronic image is generated and displayed on user device 124's screen.

At step 604, electronic application 126 and/or image generation server 128 may determine any three-dimensional shape information associated with received electronic information (e.g., such as described in step 602). In embodiments, electronic application 126 and/or image generation server 128 may electronically analyze the received electronic information with information in databases and/or electronic libraries stored in electronic application 126 and/or image generation server 128. In embodiments, electronic application 126 and/or image generation server 128 may analyze the electronic information to determine whether any particular characteristics associated with a particular shape exist. For example, electronic application 126 and/or image generation server 128 may electronically determine whether any curvature features exist, the number of endpoints of any curved or straight lines, the location of endpoints, the length of each curve and/or line, and/or any other features associated with a three-dimensional shape.

At step 606, electronic application 126 and/or image generation server 128 may determine any orientation, location, and/or distance information for a three-dimensional electronic image associated with received electronic information (e.g., such as described in step 602). In embodiments, electronic application 126 and/or image generation server 128 may electronically analyze the received electronic information with information in databases and/or electronic libraries stored in electronic application 126 and/or image generation server 128. In embodiments, electronic application 126 and/or image generation server 128 may analyze the electronic information to determine whether any particular characteristics associated with a particular orientation, location, and/or distance exist. For example, electronic application 126 and/or image generation server 128 may analyze colors, wording, numbers, line thickness, line lengths, areas of shapes, and/or other features that determine height, width, and areas and how each area and/or shape is orientated and located in comparison to other shapes and features associated with generating a three-dimensional image on the screen of user device 124. Also, for example, electronic application 126 may determine whether any color information was in the received electronic information that determines orientation, location, height, depth, or width information for one or more shapes in a generated three-dimensional electronic image.

At step 608, electronic application 126 and/or image generation server 128 may determine any alphanumeric and/or symbol information associate with received electronic information (e.g., such as the received electronic information described in step 602). In embodiments, electronic application 126 and/or image generation server 128 may electronically analyze the received electronic information with information in databases and/or electronic libraries stored in electronic application 126 and/or image generation server 128. In embodiments, electronic application 126 and/or image generation server 128 may analyze the electronic information to determine whether any particular characteristics associated with any alphanumeric electronic information exists. For example, electronic application 126 and/or image generation server 128 may analyze the orientation and shape information to determine whether any orientation, shape, texture, color, and/or any combination of orientation, shape, texture, and color corresponds to words, numbers, and/or symbols that should be displayed with the three-dimensional electronic image. For example, electronic application 126 and/or image generation server 128 may determine that the generated three-dimensional electronic image is an image of a bear and may generate "BEAR" for display with the three-dimensional electronic image.

At step 610, electronic application 126 and/or image generation server 128 may determine whether to generate any color associated with received electronic information (e.g., such as described in step 602). In embodiments, electronic application 126 and/or image generation server 128 may electronically analyze the received electronic information with information in databases and/or electronic libraries stored in electronic application 126 and/or image generation server 128. In embodiments, electronic application 126 and/or image generation server 128 may analyze the electronic information to determine whether any particular characteristics associated with one or more particular colors exist. For example, electronic application 126 and/or image generation server 128 may determine that particular shape, color, shading, or other design feature within a two-dimensional image corresponds to a particular type generated color for some or part of the three-dimensional electronic image.

At step 612, electronic application 126 and/or image generation server 128 may determine any texture information associated with received electronic information (e.g., such as described in step 602). In embodiments, electronic application 126 and/or image generation server 128 may electronically analyze the received electronic information with information in databases and/or electronic libraries stored in electronic application 126 and/or image generation server 128. In embodiments, electronic application 126 and/or image generation server 128 may analyze the electronic information to determine whether any particular characteristics associated with one or more particular textures exist. For example, electronic application 126 and/or image generation server 128 may determine that particular shape, color, shading, pattern, or other design feature within a two-dimensional image corresponds to a particular type of textured surface for some or part of the three-dimensional electronic image.

Figure 7:
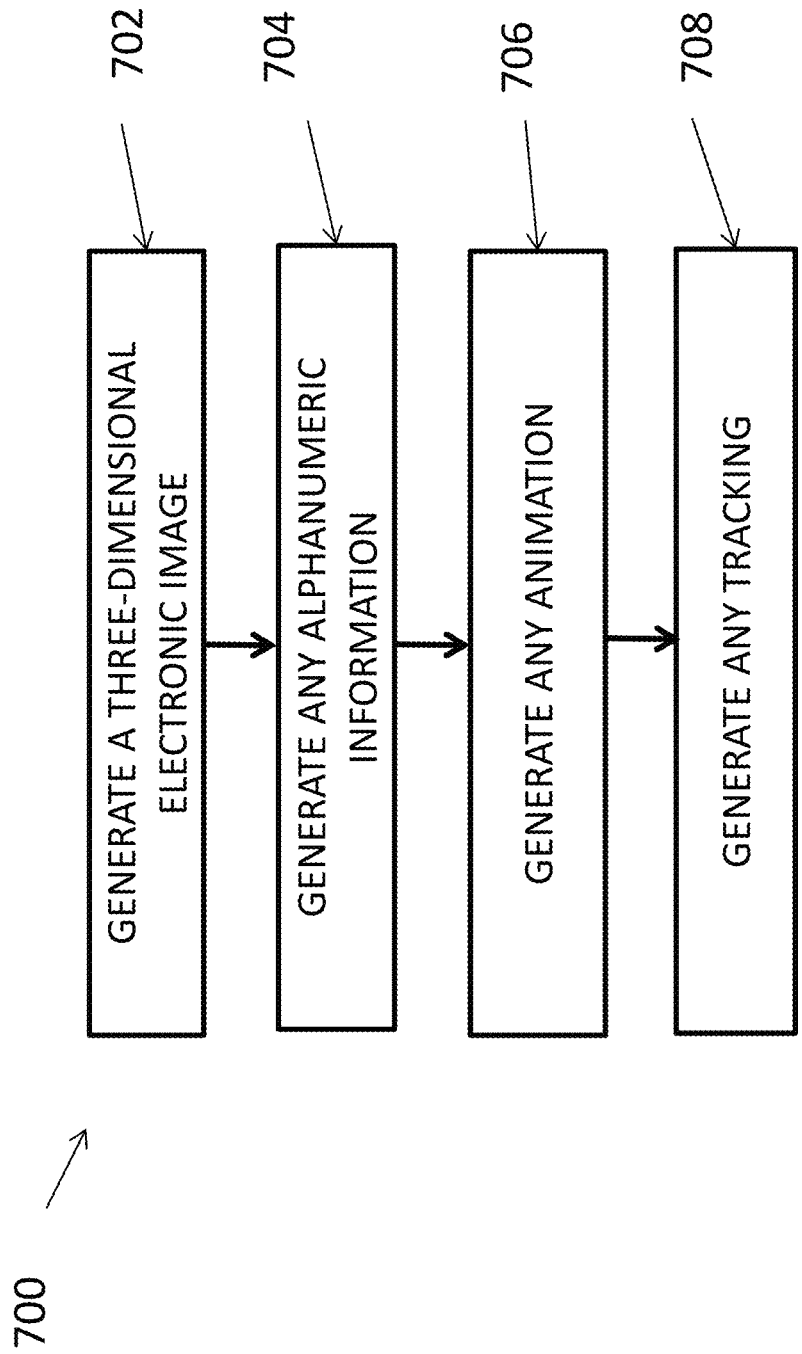
FIG. 7 is a flow chart of an example process for dynamically generating an image.

FIG. 7 is a flow chart of an example process 700 for generating a three-dimensional image, and possible additional electronic information, on a user device screen based on determining different characteristics for the three-dimensional image as described in FIG. 6. In embodiments, example process 700 may be performed by electronic application 126 and/or image generation server 128 receiving electronic information from user device 124, via electronic application 126, as described in FIG. 2.

At step 702, electronic application 126 and/or image generation server 128 may generate a three-dimensional electronic image based on analyzing (e.g., such as described in FIG. 6) received electronic information (e.g., such as received electronic information as described in step 602 in FIG. 6) with electronic information stored in databases and/or electronic libraries. In embodiments, the three-dimensional image may be generated based on combining different features based on determining shape (e.g., step 604 in FIG. 6), orientation, location, and/or distance information (e.g., step 606 in FIG. 6), color (e.g., step 610 in FIG. 6), and/or texture (e.g., step 612 in FIG. 6). In embodiments, the three-dimensional electronic image may include additional features that were not shown in the two-dimensional image. For example, a three-dimensional electronic image of a two-dimensional image of a circuit board schematic design may include color information about resistors that were not shown in the two-dimensional image.

At step 704, electronic application 126 and/or image generation server 128 may generate alphanumeric (e.g., words, numbers, etc.) and/or symbols (e.g., "$," "#," etc.) for electronic display on user device 124's screen based on analyzing (e.g., such as described in step 608 in FIG. 6) received electronic information (e.g., such as received electronic information as described in step 602 in FIG. 6) with electronic information stored in databases and/or electronic libraries. In embodiments, electronic application 126 and/or image generation server 128 may electronically display the alphanumeric information on user device 124's screen at the same time that the three-dimensional electronic image is being electronically displayed on user device 124's screen.

At step 706, electronic application 126 and/or image generation server 128 may generate animation of the three-dimensional electronic image. In embodiments, animation of the three-dimensional electronic image may be a feature that is electronically displayed on user device 124's screen based upon electronic commands that are initiated by a user of user device 125 or automatically by electronic application 1256 and/or image generation server 128. In embodiments, the animation may result in different levels of animation speed and also allow the user to change the animation speed level (e.g. via touching user device 124's screen, voice commands, a button on user device 124, etc.). In embodiments, animation may also include rotation and/or any other type of movement.

At step 708, electronic application 126 and/or image generation server 128 may generate a tracking feature associated with the three-dimensional electronic image. In embodiments, the tracking feature may maintain a three-dimensional electronic image on user device 124's screen of a non-electronic two-dimensional image as user device 124 (or the non-electronic two-dimensional image) is moved around while still being shown as an image through a camera device associated with user device 124. Accordingly, the tracking feature allows for a spatial mapping/relationship between the three-dimensional electronic image and the two-dimensional image as described in FIG. 5.

Figure 8A:
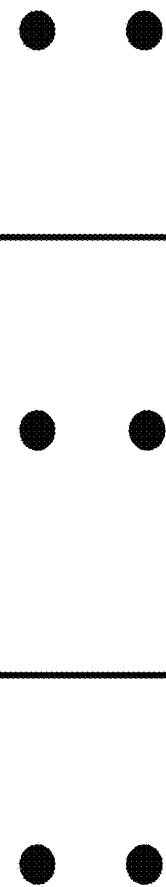

FIG. 8A describes an example data structure 802 that stores electronic information associated with different types of shapes that may be a part of a three-dimensional electronic image. In embodiments, data structure 802 may include a collection of fields such as Shape 804, Numerical Value 806, and Wording 808. Although FIG. 8A shows example fields 804-808, in other embodiments, data structure 800 may include fewer fields, different fields, additional fields, and/or differently arranged fields than depicted in FIG. 8A. In embodiments, image generation server 128 may store some or all of data structure 802. Additionally, or alternatively, user device 124 may store some or all of data structure 802.

In embodiments, Shape 804 may be one or more shapes that are generated based on information received in step 602 of FIG. 6 and determined in step 604 of FIG. 6. In embodiments, Numerical Value 806 may be a numerical value associated with a particular texture. In embodiments, the numerical value may be electronically displayed with a three-dimensional electronic image. In embodiments, Wording 808 may be alphabetical, alphanumeric symbols, and other symbols (e.g., "@," "%," "#," etc.) that may be electronically displayed with a three-dimensional electronic image for a particular shape or for a particular group of shapes. For example, as shown in FIG. 8A, Shape 1 has no numerical value for display—"NULL."

FIG. 8B describes an example data structure 812 that stores electronic information associated with different orientations that may be a part of a three-dimensional electronic image. In embodiments, data structure 812 may include a collection of fields such as Orientation 814, Numerical Value 816, and Wording 818. Although FIG. 8B shows example fields 814-816, in other embodiments, data structure 800 may include fewer fields, different fields, additional fields, and/or differently arranged fields than depicted in FIG. 8B. In embodiments, image generation server 128 may store some or all of data structure 812. Additionally, or alternatively, user device 124 may store some or all of data structure 812.

In embodiments, Orientation-Location-Distance 814 may be associated with an orientation, location, and/or distance information that is generated based on information received in step 602 of FIG. 6 and determined in step 606 of FIG. 6. In embodiments, Numerical Value 816 may be a numerical value associated with a particular orientation. In embodiments, the numerical value may be electronically displayed with a three-dimensional electronic image. In embodiments, Wording 818 may be alphabetical, alphanumeric symbols, and other symbols (e.g., "@," "%," "#," etc.) that may be electronically displayed with a three-dimensional electronic image.

Figure 8C:

FIG. 8C describes an example data structure 820 that stores electronic information associated with different colors that may be a part of a three-dimensional electronic image. In embodiments, data structure 820 may include a collection of fields such as Color 822, Numerical Value 824, and Wording 826. Although FIG. 8C shows example fields 822-826, in other embodiments, data structure 820 may include fewer fields, different fields, additional fields, and/or differently arranged fields than depicted in FIG. 8C. In embodiments, image generation server 128 may store some or all of data structure 820. Additionally, or alternatively, user device 124 may store some or all of data structure 820.

In embodiments, Color 822 may be associated with a color that is generated based on information received in step 602 of FIG. 6 and analyzed in step 610 of FIG. 6. In embodiments, Numerical Value 824 may be a numerical value associated with a particular color. In embodiments, the numerical value may be electronically displayed with a three-dimensional electronic image. In embodiments, Wording 826 may be alphabetical, alphanumeric symbols, and other symbols (e.g., "@," "%," "#," etc.) that may be electronically displayed with a three-dimensional electronic image.

FIG. 8D describes an example data structure 828 that stores electronic information associated with different textures that may be a part of a three-dimensional electronic image. In embodiments, data structure 828 may include a collection of fields such as Texture 830, Numerical Value 832, and Wording 834. Although FIG. 8D shows example fields 830-834, in other embodiments, data structure 828 may include fewer fields, different fields, additional fields, and/or differently arranged fields than depicted in FIG. 8D. In embodiments, image generation server 128 may store some or all of data structure 828. Additionally, or alternatively, user device 124 may store some or all of data structure 828.

In embodiments, Texture 830 may be associated with a texture that is generated based on information received in step 602 of FIG. 6 and analyzed in step 612 of FIG. 6. In embodiments, Numerical Value 832 may be a numerical value associated with a particular texture. In embodiments, the numerical value may be electronically displayed with a three-dimensional electronic image. In embodiments, Wording 834 may be alphabetical, alphanumeric symbols, and other symbols (e.g., "@," "%," "#," etc.) that may be electronically displayed with a three-dimensional electronic image.

Figure 9A:
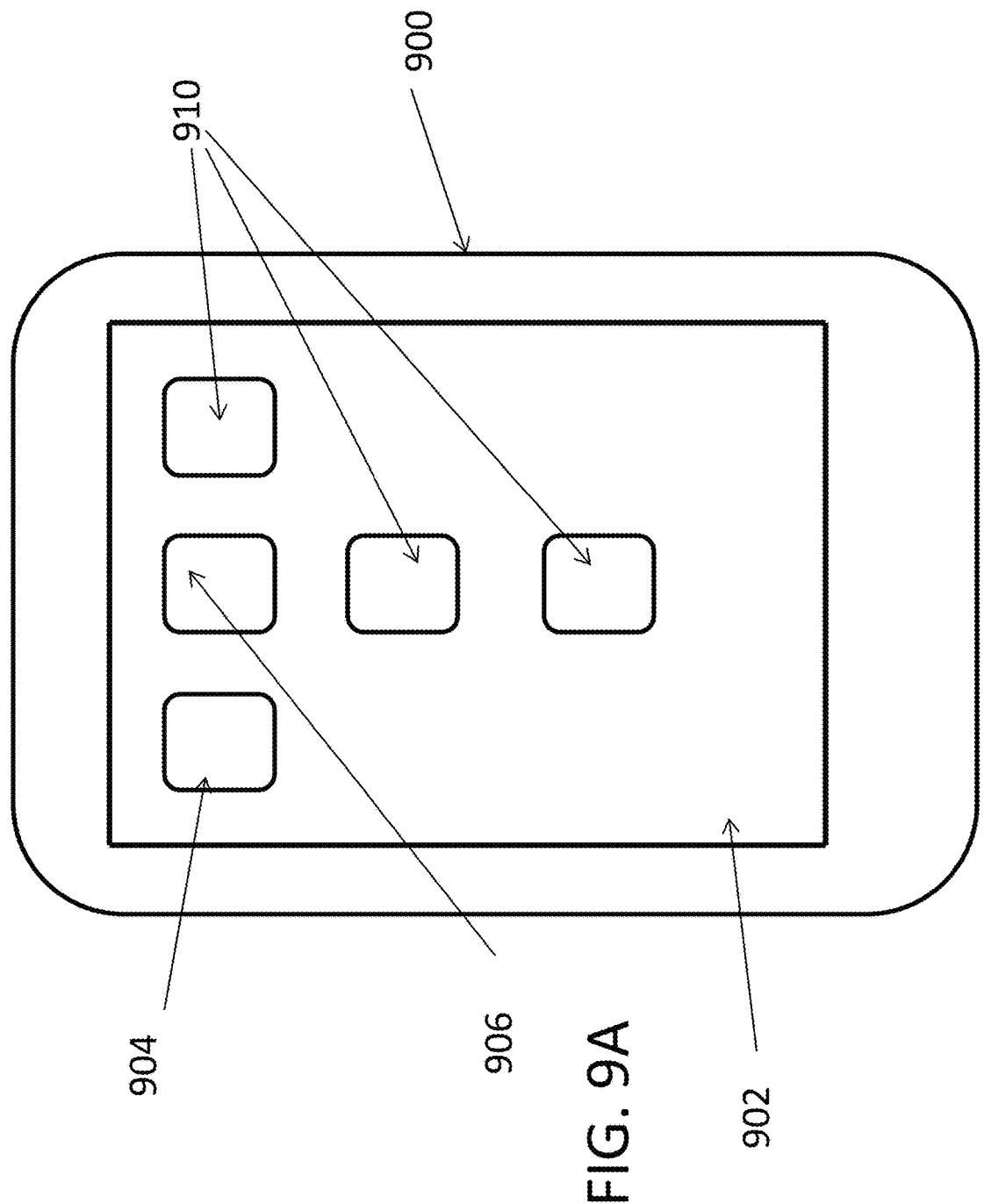

FIGS. 9A-9B are diagrams of an example process for opening an electronic application to generate three-dimensional electronic images. In embodiments, the example process described in the following figures may use one or more of the devices, networks, and electronic applications described in FIGS. 2 and 3. Furthermore, in embodiments, the example processes described in the following figures may have one or more features described in the flowcharts (e.g., FIGS. 6 and 7) and/or data structure (e.g., described in FIGS. 8A-8D). In embodiments, interactions with the electronic application may require a user to log into the electronic application by using a special password or special identifier.

FIG. 9A shows an example user device 900. In embodiments, user device 900 may be similar to user device 124 as described in FIG. 2. As shown in FIG. 9A, user device 900 includes user device screen 902, electronic application icon 904, camera selection icon 906, and electronic application icons 910. In embodiments, user device screen 902 may be a screen that displays various graphics, alphanumeric values, pictures, quick response (QR) codes, emails, websites, and/or other types of displayable images. In embodiments, user device screen 902 may be a touch screen that allows the user to initiate electronic actions via user device 900 via the user touching, swiping, etc., user device screen 902. In embodiments, electronic application icon 904 may be an icon associated with Electronic Application A (e.g., electronic application 126 as described in other figures). When selected, electronic application icon 904 may electronically command user device 900 to initiate Electronic Application A. In embodiments, camera selection icon 906 may be an electronic icon that, when selected, electronically commands user device 900 to initiate a camera device associated with user device 900. In embodiments, electronic application icons 910 may be associated with other types of electronic applications and/or software (e.g., website applications, map applications, game applications, etc.).

In embodiments, electronic application icon 904 may be selected by a user of user device 900. Upon selection of electronic application icon 904, as shown in FIG. 9B, Electronic Application A (e.g., electronic application 126) may be electronically initiated upon user device 900. In embodiments, upon initiating Electronic Application A, Electronic Application A may electronically communicate with a camera device associated with user device 900 and electronically take control of the camera device to take images and send electronic information associated with the electronic images to Electronic Application A and/or other computing devices (e.g., image generation server 128). Accordingly, Electronic Application A may use the electronic information to generate three-dimensional electronic images as described in other figures. Thus, user device screen 902 is now associated with whatever comes into view of the camera device lens. While FIG. 9B shows a blank user device screen 902, user device screen 902 with Electronic Application A may show images as they appear in the camera device's lens since Electronic Application A has electronically initiated a camera device associated with user device 900.

FIGS. 10A-10B and 11A-11C are diagrams of a user device (e.g., user device 124) that can receive electronic information about a two-dimensional image and generate a three dimensional electronic image and additional features. In embodiments, the example process described in the following figures may use one or more of the devices, networks, and electronic applications described in FIGS. 2 and 3. Furthermore, in embodiments, the example processes described in the following figures may have one or more features described in the flowcharts in FIGS. 6 and 7 and/or data structure described in FIGS. 8A-8D.

As shown in FIG. 10A, user device screen 902 is placed over a non-electronic two-dimensional image 1012, which has a pattern 1013, such that the non-electronic two-dimensional image is displayed via the camera device of user device 900.

In embodiments, the user of user device 900 may decide to take an image. In embodiments, the user may select an icon on user device screen 902, the user may touch user device screen 902 (e.g., swipe, double-touch, etc.), or the user may select a button associated with user device 900. Upon deciding to take an image, the camera device sends the electronic information to Electronic Application A (e.g., electronic application 126) and/or another device (e.g., image generation server 128). In embodiments, as described in other figures, Electronic Application A and/or another device may generate dynamically and automatically generate a three-dimensional electronic image 1014 as shown in FIG. 9B. In embodiments, Electronic Application A may analyze pattern 1013 to determine one or more features for three-dimensional electronic image 1014, such as height, width, or length dimensions.

Figure 11A:
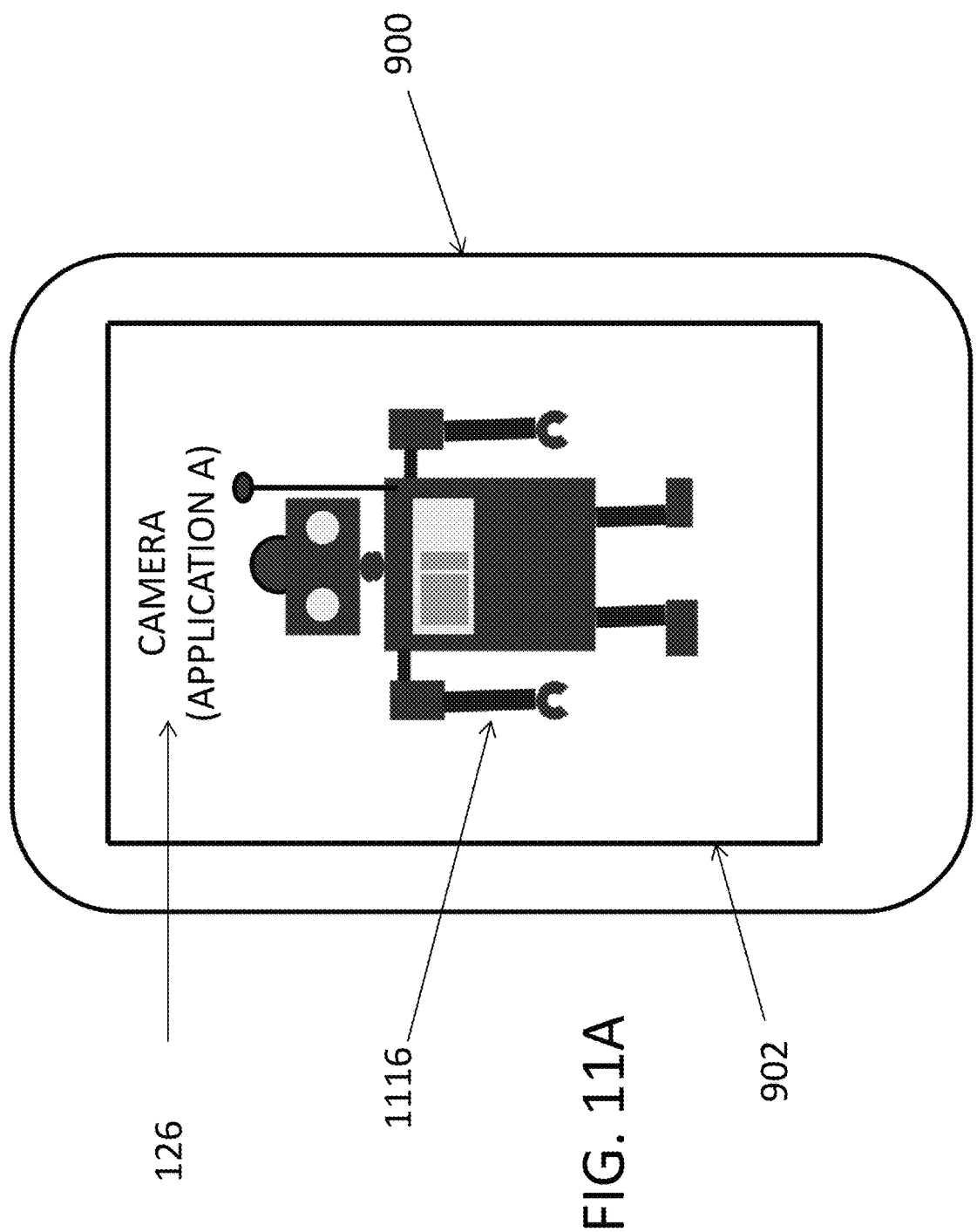
Figure 11B:
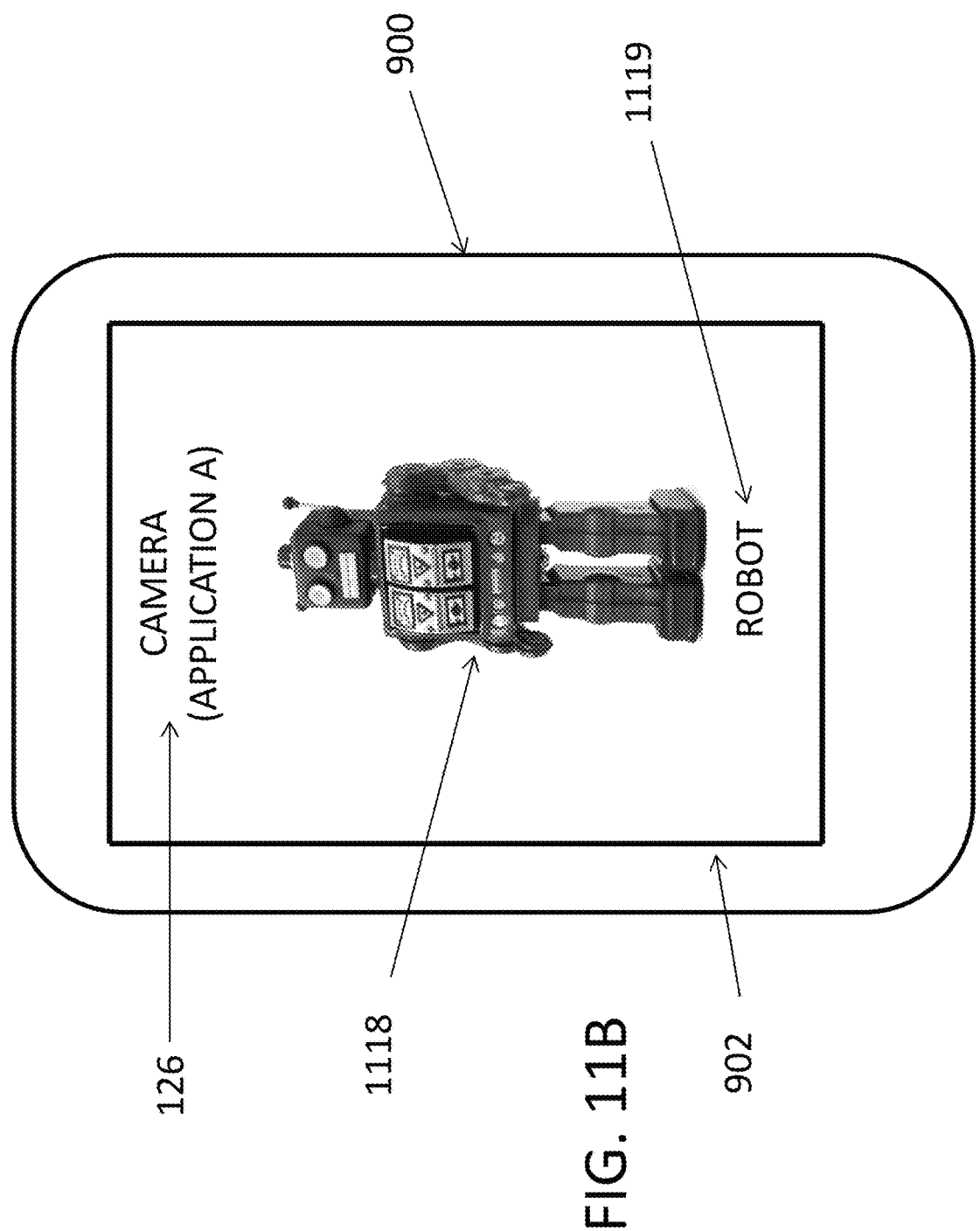

As shown in FIG. 11A, user device screen 902 may also be placed over another non-electronic two-dimensional image 1116 such that the non-electronic two-dimensional image is displayed via the camera device of user device 900. Alternatively, FIG. 11A may be a screen shot of a two-dimensional electronic image (of a non-electronic two-dimensional image) whose electronic information can then be converted to a three-dimensional electronic image.

Figure 10B:
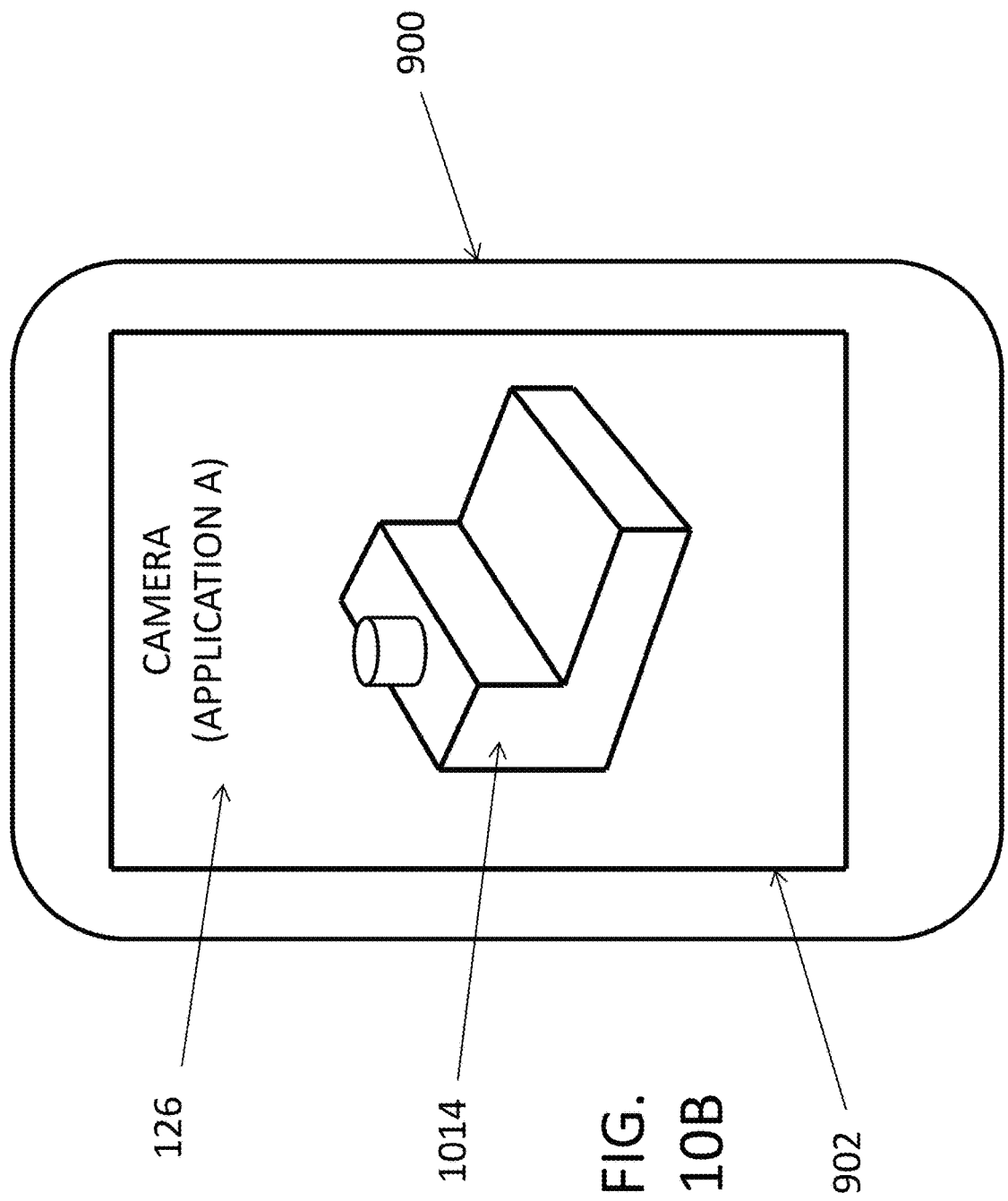

In embodiments, the user of user device 900 may decide to take an image. In embodiments, the user may select an icon, the user may touch user device screen 900, or the user may select a button associated with user device 900. Upon taking an image, the camera device sends the electronic information to Electronic Application A (e.g., electronic application 126) and/or another device (e.g., image generation server 128). In embodiments, as described in other figures, Electronic Application A and/or another device may generate dynamically and automatically generate a three-dimensional electronic image 1118 as shown in FIG. 10B. In this example, Electronic Application A has added additional features to the three-dimensional image that were not in non-electronic two-dimensional image 1116. In addition, Electronic Application A and/or another device may generate text 1119 ("ROBOT"), associated with the three-dimensional electronic image 1118, for display.

In embodiments, Electronic Application A may also be used to track the non-electronic two-dimensional image as user device 900 is moved around while maintaining the two-dimensional image in user device screen 902. In embodiments, as shown in FIG. 11C, as a screen shot, Electronic Application A may also generate animation associated with a three-dimensional electronic image. Thus, three-dimensional electronic image 1118 may move from one area of user device screen 902 to another area of user device screen 902. Alternatively, a user may use the touch screen to change the orientation and/or direction of three-dimensional electronic image 1118 in a manner similar to what is shown in FIG. 11C.

In embodiments, the user may change the size of the three-dimensional electronic image, as shown in user device screen 902, such that a smaller version of three-dimensional electronic image is shown in user device screen 902 or a larger or a portion of the three-dimensional electronic image, such as 1118 shown in FIG. 11C.

Figure 12:
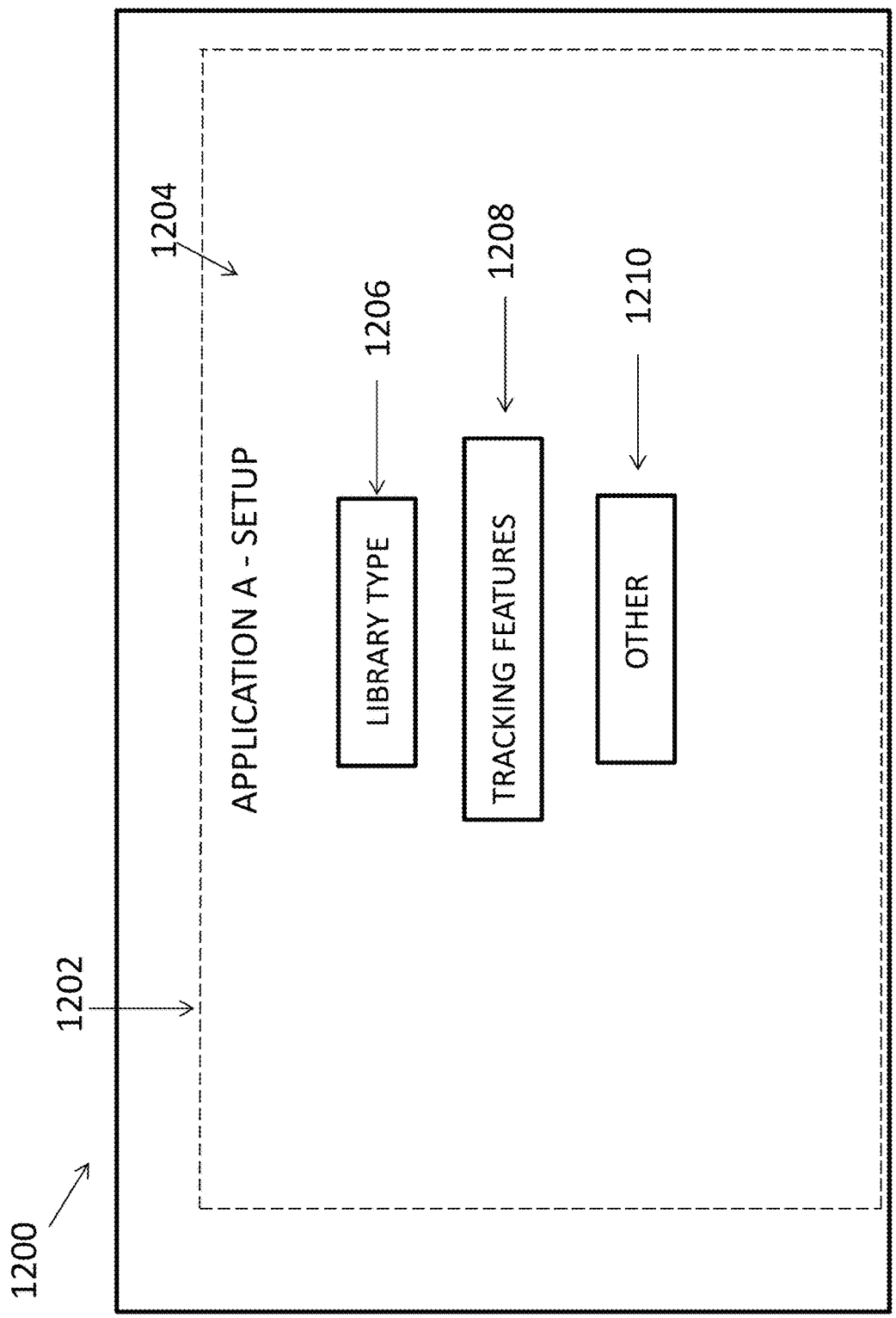
FIGS. 12 and 13 are example diagrams for creating one or more parameters associated with an electronic application.
Figure 13:
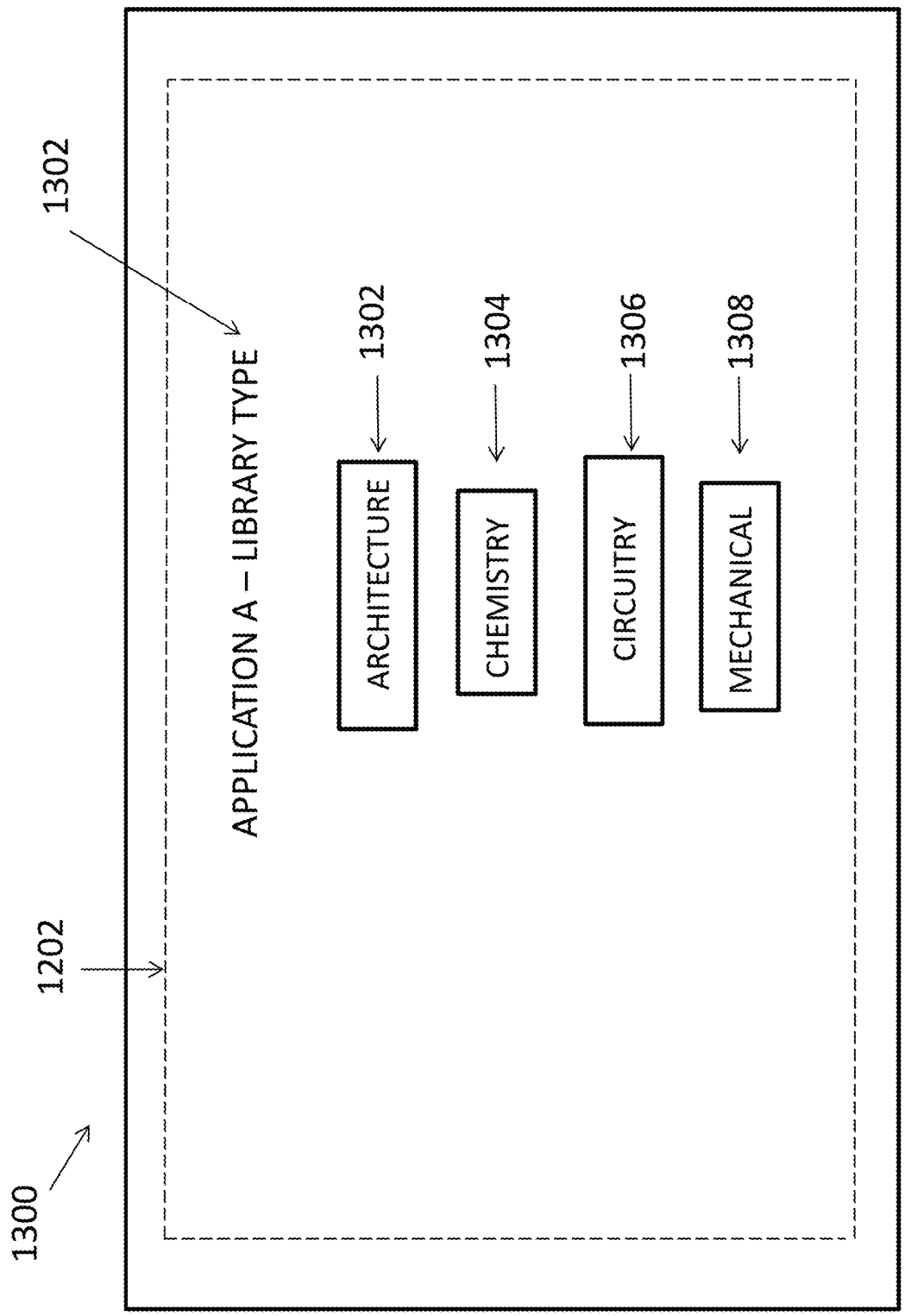

FIG. 12 shows an example screen shot 1200 as shown on user device screen 1202 (e.g., user device screen 902) and describes setup screen 1204 for Electronic Application A. As shown in FIG. 12, setup screen 1204 includes library type icon 1206, tracking features icon 1208, and other icon 1210. In embodiments, library type icon 1206 when selected may allow a user, prior to taking a three-dimensional electronic image, to determine a particular library of electronic information that correlates to a particular subject matter associated with a non-electric two-dimensional image. For example, if a user wishes to take a three-dimensional electronic image of a chemical formula, he may, as shown in FIG. 13, select icon 1304 (as shown in example screen shot 1300) which then allows Electronic Application A and/or a computing device (e.g., image generation system 128) to use electronic information in that particular library to generate a three-dimensional electronic image. Alternatively, if for example, a user wishes to take a three-dimensional electronic image of an architectural drawing, then the user may select icon 1306 or icon 1308 if the non-electronic two-dimensional image is associated with a mechanical drawing. In embodiments, if a user decides not to select a particular library, then Electronic Application A (e.g., electronic application 126) may determine, based on the design features of the non-electric two-dimensional image, the subject matter associated with the non-electric two-dimensional image and automatically determine and access the library associated with that particular subject matter. While FIG. 13 shows a particular number of libraries, Electronic Application A (and, similarly, electronic application 126) may include additional or fewer libraries for selection by a user.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

It should be noted that a two-dimensional image, as described in one or more figures, may be a non-electronic two-dimensional image, or an electronic two-dimensional image associated with a webpage or any other type of electronic page viewable on a user device (e.g., user device 124). Also, as described in other figures, while three-dimensional electronic images may be electronically and automatically generated, three-dimensional electronic images may be generated within a particular period of time (e.g., within five seconds, 10 seconds, 20 seconds, 60 seconds, etc.). Also, while the above figures describe determining and generating three-dimensional electronic images, the above described processes, flowcharts, data structures may also be used to generate four-dimensional or greater electronic images. Furthermore, while electronic application 126 may be selected via an electronic icon displayed on user device 124's screen, electronic application 126 may be selected via an electronic icon displayed within the camera application after an icon associated with the camera device is selected. It should also be understood that any process or flow described in any previous drawings may be associated with one or more steps within an electronic communications method that may be performed by any device described in the above figures.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 2. Also it will be understood that any of the various actions can result in any type of electronic information to be displayed in real-time and/or simultaneously on multiple user devices (e.g., similar to user device 124). For FIGS. 6 and 7, the order of the blocks may be modified in other implementations. Further, non-dependent blocks may be performed in parallel.

It should also be understood that electronic communications between electronic application 126 and other applications and/or servers may include the electronic transfer of electronic tokens may result in (i) the change of a value stored in a computing device, server and/or database based on one or more electronic communications, and/or (ii) the change in the amount of memory storage of electronic bits in a computing device, server and/or database based on one or more electronic communications. While electronic communications between different servers, computing devices, and electronic application 126 may occur within an electronic environment, some electronic communications may be associated with non-electronic communications. It should also be understood that image may refer to diagrams, figures, drawings, design drawings, blueprints, formulas, mechanical figures, electrical figures, schematic drawings, and/or any other design or shape that has lines and/or curves.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
   receiving, by a device, electronic information associated with a two-dimensional image;
   analyzing, by the device, the electronic information,
      where the analyzing the electronic information includes analyzing color information within the two-dimensional image, where the color information determines a shape dimension of the three-dimensional electronic image;
   generating, by the device, a three-dimensional electronic image based on the electronic information, where analyzing a line thickness in the two-dimensional image determines a height dimension of a three-dimensional shape that is generated within the three-dimensional electronic image.

2. The electronic communications method of claim 1, where the two-dimensional image is a non-electronic two-dimensional image.

3. The electronic communications method of claim 2, where the electronic information is generated by an electronic application electronically controlling a camera device.

4. The electronic communications method of claim 1, where the analyzing the electronic information includes analyzing shape information associated with the two-dimensional image based on an electronic library that has analysis information relating to the type of the two-dimensional image.

5. The electronic communications method of claim 1, where the analyzing the electronic information includes analyzing orientation information associated with the two-dimensional image.

6. The electronic communications method of claim 1, further comprising: generating, by the device, text for display alongside the three-dimensional electronic image, where the text is based on analyzing color information within the two-dimensional image.

7. The electronic communications method of claim 1, further comprising: generating, by the device, animation features of the three-dimensional electronic image.

8. The electronic communications method of claim 1, where the analyzing the electronic information includes analyzing a line that is part of the two-dimensional image, where analyzing the line generates a color in the three-dimensional electronic image which is not displayed in the two-dimensional image.

9. The electronic communications method of claim 1, where the three-dimensional image is further based on:
   determining shape,
   orientation, location,
   distance information, and
   texture.

10. The electronic communications method of claim 1, further comprising:
   analyzing a colored line in another two-dimensional image to generate another three-dimensional image, where the analyzing the colored line in the other two-dimensional image generates another three-dimensional shape in the other three-dimensional image that is different from the three-dimensional shape in the three-dimensional image when the same colored line is analyzed in the two-dimensional image.

11. The electronic communications method of claim 1, where analyzing the electronic information includes analyzing colors, wording, numbers, line thickness, line lengths, areas of shapes, and other features in the two-dimensional image that determine height, width, and areas and how each area and shape is orientated and located in comparison to other shapes associated with generating the three-dimensional image.

12. A device, comprising:
   one or more processors to:
      receive electronic information associated with a non-electronic two-dimensional image;
      analyze the electronic information;
      generate a three-dimensional electronic image based on analyzing the electronic image;
      generate text for display alongside the three-dimensional electronic image,
         where the text is based on analyzing color information within the non-electronic two-dimensional image; and
      display, via a screen of the device, the generated three-dimensional electronic image and the text,
         where analyzing the shape information includes analyzing a line thickness of a particular shape in the non-electronic two-dimensional image determines a height dimension for a three-dimensional shape within the three-dimensional electronic image.

13. The device of claim 12, where the electronic information is generated by a camera device, associated with the device, taking an electronic image of the two-dimensional image.

14. The device of claim 12, where analyzing the line thickness includes analyzing a line within the non-electronic two-dimensional image.

15. The device of claim 12, where analyzing the electronic information includes analyzing curvature information associated with the non-electronic two-dimensional image.

16. The device of claim 12, where analyzing the electronic information includes analyzing color information associated with the non-electronic two-dimensional image.

17. The device of claim 12, where analyzing the electronic information includes analyzing pattern information within the non-electronic two-dimensional image.

18. A non-transitory computer-readable medium storing instructions, the instructions comprising:
   a plurality of instructions that, when executed by a processor of a device, cause the processor to:
      analyze electronic information associated with a two-dimensional image,
         where the analyzing the electronic information includes analyzing a color line that is part of the two-dimensional image, where the color line determines a shape dimension of the three-dimensional electronic image; and
      generate a three-dimensional electronic image based on analyzing the electronic information, where the analyzing the electronic information includes analyzing the color line, as well as based on analyzing at least one of:
      wording,
      numbers,
      line thickness,
      line lengths,
      areas of shapes, and
      other features in the two-dimensional image that determine height, width, and areas and how each area and shape is orientated and located in comparison to other shapes and features associated.

* * * * *